(12) United States Patent
Otsuka et al.

(10) Patent No.: US 10,725,474 B2
(45) Date of Patent: Jul. 28, 2020

(54) ACTION PLANNING DEVICE HAVING A TRAJECTORY GENERATION AND DETERMINATION UNIT THAT PREVENTS ENTRY INTO A FAILURE OCCURRENCE RANGE

(71) Applicant: Hitachi Automotive Systems, Ltd., Hitachinaka-shi, Ibaraki (JP)

(72) Inventors: Satoshi Otsuka, Tokyo (JP); Noritaka Matsumoto, Tokyo (JP); Kouhei Sakurai, Hitachinaka (JP); Taisetsu Tanimichi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/445,869

(22) Filed: Jun. 19, 2019

(65) Prior Publication Data

US 2019/0369624 A1 Dec. 5, 2019

Related U.S. Application Data

(63) Continuation of application No. 15/325,805, filed as application No. PCT/JP2015/067389 on Jun. 17, 2015.

(30) Foreign Application Priority Data

Aug. 7, 2014 (JP) .................................. 2014-160941

(51) Int. Cl.
*B60W 10/20* (2006.01)
*G05D 1/02* (2020.01)
(Continued)

(52) U.S. Cl.
CPC ............. *G05D 1/0214* (2013.01); *B60Q 1/26* (2013.01); *B60R 16/0231* (2013.01);
(Continued)

(58) Field of Classification Search
CPC ............ G08G 1/017; G08G 1/22; G08G 1/20; G08G 1/202; G08G 1/162; G08G 1/09623;
(Continued)

(56) References Cited

U.S. PATENT DOCUMENTS 5,557,522 A 9/1996 Nakayama et al.
9,523,984 B1 * 12/2016 Herbach ............... B62D 15/025
(Continued)

FOREIGN PATENT DOCUMENTS

JP 2008-012989 A 1/2008
JP 2010-36856 A 2/2010
(Continued)

OTHER PUBLICATIONS

Decision to Grant a Patent dated Nov. 20, 2018 in the corresponding Japanese Patent Application No. 2018-012144 with translation (five (5) pages).
(Continued)

*Primary Examiner* — Richard A Goldman
(74) *Attorney, Agent, or Firm* — Crowell & Moring LLP

(57) ABSTRACT

Vehicle systems that implement action planning for a vehicle have had difficulty in maintaining safety in the event of a failure in a recognition device since these systems generate trajectories and control the vehicle on the basis of outside-world information recognized by recognition devices. The present invention was conceived in light of the aforementioned situation and addresses the problem of maintaining safety even in the event of a failure in a recognition device of a vehicle system. This problem can be solved by an action planning device having a failure detection unit for detecting a failure in an outside-world recognition unit and a trajectory generation/determination unit for executing an action on the occurrence of a failure on the basis of outside-world information outputted by the outside-world recognition unit,
(Continued)

wherein the trajectory generation/determination unit takes an action for coping with the failure on the basis of failure information from the failure detection unit.

16 Claims, 11 Drawing Sheets

(51) Int. Cl.
| | |
|---|---|
| *B60R 21/00* | (2006.01) |
| *B60W 50/02* | (2012.01) |
| *B60Q 1/26* | (2006.01) |
| *G08G 1/16* | (2006.01) |
| *B60R 16/023* | (2006.01) |
| *B60W 30/18* | (2012.01) |
| *B60W 40/06* | (2012.01) |
| *B60W 50/14* | (2020.01) |
| *B60Q 5/00* | (2006.01) |
| *B60Q 1/50* | (2006.01) |
| *B60Q 9/00* | (2006.01) |

(52) U.S. Cl.
CPC ....... *B60R 21/00* (2013.01); *B60W 30/18163* (2013.01); *B60W 40/06* (2013.01); *B60W 50/02* (2013.01); *B60W 50/14* (2013.01); *G08G 1/165* (2013.01); *G08G 1/166* (2013.01); *G08G 1/167* (2013.01); *B60Q 1/50* (2013.01); *B60Q 5/005* (2013.01); *B60Q 9/00* (2013.01)

(58) Field of Classification Search
CPC ............ G08G 1/09626; G08G 1/0965; G08G 1/0968; B60W 10/04; B60W 10/18; B60W 10/20; B60W 2410/42; B60W 2410/52; B60W 2550/30; B60W 2550/40; B60W 2710/00; G05D 1/0246; G05D 1/0289; G05D 2201/0213; G07C 5/0816; G07C 5/0841
USPC .... 701/25, 23, 31.4, 70, 2, 36, 41, 96, 29.2, 701/93
See application file for complete search history.

(56) References Cited

U.S. PATENT DOCUMENTS

| | | | |
|---|---|---|---|
| 9,563,814 B1 | 2/2017 | Wilbert et al. | |
| 9,669,842 B2* | 6/2017 | Matsumoto | B60W 50/045 |
| 2005/0015201 A1* | 1/2005 | Fields | G08G 1/163 |
| | | | 701/301 |
| 2009/0237268 A1 | 9/2009 | Tomoyuki et al. | |
| 2010/0019939 A1 | 1/2010 | Cabaret De Alberti et al. | |
| 2010/0208074 A1* | 8/2010 | Hattori | B60Q 1/50 |
| | | | 348/148 |
| 2010/0318240 A1* | 12/2010 | Kindo | G08G 1/166 |
| | | | 701/1 |
| 2012/0188097 A1* | 7/2012 | Brillhart | G08G 1/161 |
| | | | 340/902 |
| 2012/0218412 A1 | 8/2012 | Dellantoni et al. | |
| 2012/0221168 A1* | 8/2012 | Zeng | G08G 1/09626 |
| | | | 701/1 |
| 2012/0271864 A1 | 10/2012 | Morlock | |
| 2012/0296523 A1 | 11/2012 | Ikeda et al. | |
| 2013/0030651 A1* | 1/2013 | Moshchuk | G08G 1/166 |
| | | | 701/41 |
| 2014/0145660 A1* | 5/2014 | Shimada | H02P 6/183 |
| | | | 318/400.33 |
| 2014/0277943 A1 | 9/2014 | Lee et al. | |
| 2014/0368668 A1* | 12/2014 | Sasabuchi | G01S 13/867 |
| | | | 348/187 |
| 2017/0270384 A1 | 9/2017 | Wilbert et al. | |
| 2018/0052463 A1* | 2/2018 | Mays | B60T 17/18 |
| 2018/0173970 A1* | 6/2018 | Bayer | G06K 9/629 |
| 2018/0174467 A1* | 6/2018 | Fukuda | B62D 15/025 |
| 2018/0346019 A1* | 12/2018 | Fujii | B62D 6/003 |
| 2019/0051064 A1 | 2/2019 | Tojima et al. | |
| 2019/0339701 A1 | 11/2019 | Pedersen et al. | |

FOREIGN PATENT DOCUMENTS

| | | |
|---|---|---|
| JP | 2010-188903 A | 9/2010 |
| JP | 2010-211301 A | 9/2010 |
| JP | 2010-287093 A | 12/2010 |
| JP | 2011-048470 A | 3/2011 |
| JP | 2011-189803 A | 9/2011 |
| JP | 2011-240816 A | 12/2011 |
| JP | 2012-252497 A | 12/2012 |
| JP | 2013-147194 A | 8/2013 |
| JP | 2014-21709 A | 2/2014 |
| WO | WO 2006-070865 A1 | 6/2008 |
| WO | WO 2014/006893 A1 | 1/2014 |
| WO | WO 2014/010546 A1 | 1/2014 |

OTHER PUBLICATIONS

U.S. Notice of Allowance issued in U.S. Appl. No. 15/325,805 dated Apr. 22, 2020 (seven pages).
International Search Report (PCT/ISA/210) issued in PCT Application No. PCT/JP2015/067389 dated Sep. 8, 2015 with English-language translation (four (4) pages).
Japanese-language Written Opinion (PCT/ISA/237) issued in PCT Application No. PCT/JP2015/067389 dated Sep. 8, 2015 (four (4) pages).
European Search Report issued in counterpart European Application No. 15830281.0 dated Mar. 5, 2018 (eight (8) pages).

* cited by examiner

1001

| OBJECT ID | RECOGNITION DEVICE ID | POSITION INFORMATION | TYPE | SPEED INFORMATION | RANGE | ... |
|---|---|---|---|---|---|---|
| Data_A | Sensor_A | xa, ya | VEHICLE | 0, 100 | dxa, dya | |
| Data_B | Sensor_A | xb, yb | WALL | -- | dxb, dyb | |
| Data_C | Sensor_B | xc, yc | VEHICLE | 5, 100 | dxc, dyc | |
| ... | | ... | ... | ... | ... | |
| ... | | ... | ... | ... | ... | |
| ... | | ... | ... | ... | ... | |
| Data_Z | Sensor_A | xz, yz | WHITE LINE | -- | dxz, dyz | |

OUTSIDE-WORLD RECOGNITION MAP 1001 (LIST TYPE)

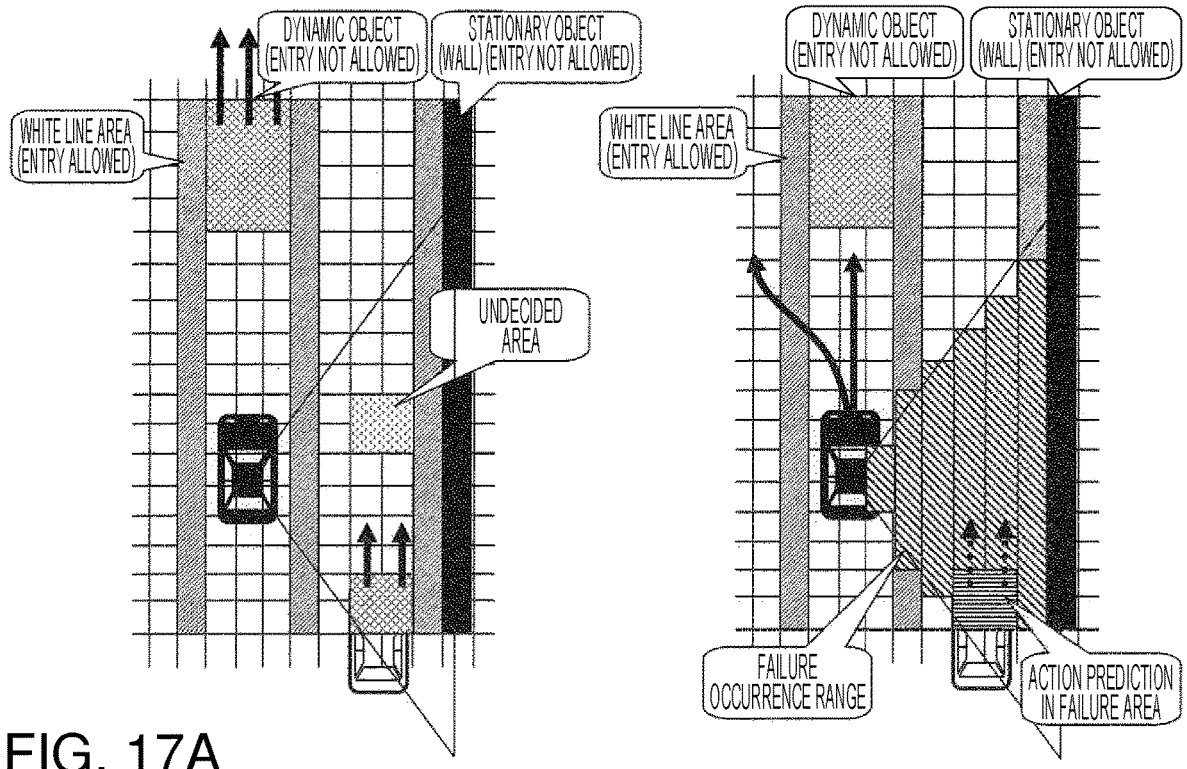
FIG. 17A
FIG. 17B
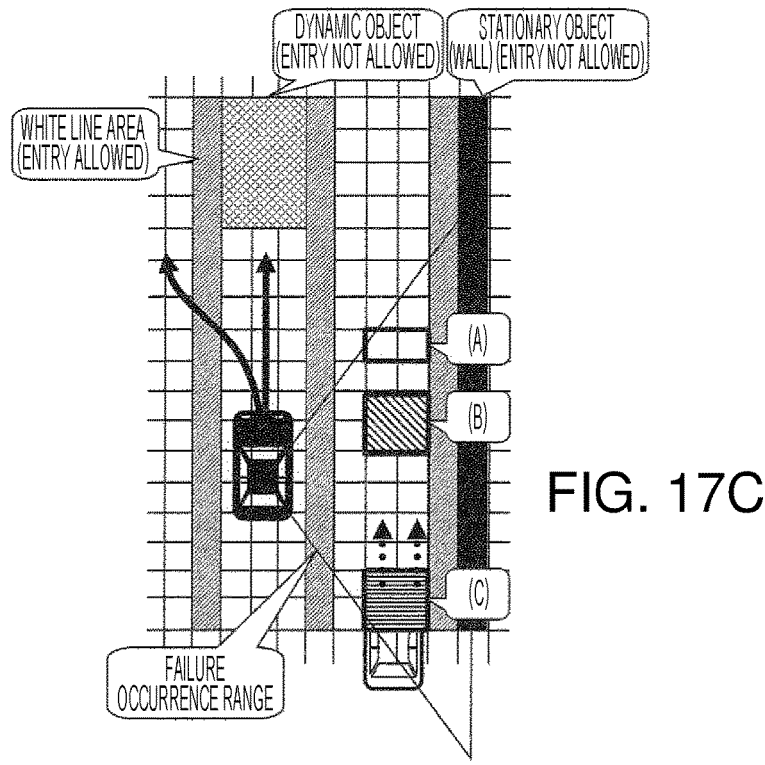
FIG. 17C

ACTION PLANNING DEVICE HAVING A TRAJECTORY GENERATION AND DETERMINATION UNIT THAT PREVENTS ENTRY INTO A FAILURE OCCURRENCE RANGE

CROSS REFERENCE TO RELATED APPLICATION

The present application is a continuation of U.S. application Ser. No. 15/325,805, filed Jan. 12, 2017, which claims from and is a national stage of International Application No. PCT/JP2015/067389, filed Jun. 17, 2015, which claims priority from Japanese Patent Application No. 2014-160941, filed Aug. 7, 2014, the contents of which are hereby incorporated by reference herein.

TECHNICAL FIELD

The present invention relates to an action planning device and an action planning system.

BACKGROUND ART

As a background art of the present technical field, there is JP 2010-287093 A (PTL 1). In this publication, an object is to provide "a course evaluation device and a course evaluation method that can improve running efficiency, can avoid interference with other object, and can evaluate a course of a moving object while realizing both the running efficiency and the interference avoidance" and "a course generation unit 11 generates a plurality of prediction courses of an own vehicle on the basis of running information. A negative course generation unit 12 generates negative courses for the plurality of prediction courses. A pedestrian approaching action calculation unit 13 acquires a pedestrian approaching course on the basis of running information transmitted from a running information acquisition unit 2. A negative course evaluation unit 14 compares the plurality of negative courses and the pedestrian approaching course and generates a negative evaluation value for each negative course. The course evaluation unit 15 determines the prediction course having a largest negative evaluation value as a course of the own vehicle" is described as a resolving means.

As another background art, there is JP 2010-211301 A (PTL 2). In this publication, an object is to provide "an accident prediction/notification device, an accident prediction/notification system, and an on-vehicle device that cope with a collision accident of pedestrians when turning left at an intersection and predict an area where an accident may occur in consideration of past traffic path histories of pedestrians and vehicles" and "when a vehicle entering the intersection arrives at a designated point A1, an accident occurrence prediction area is predicted on the basis of pedestrian information near the intersection when the entering vehicle arrives at the designated point A1, signal light information of a traffic light 5, and a learning area map stored in a storage unit 37 and the accident occurrence prediction area is transmitted as an accident occurrence prediction area map to the on-vehicle device 61. The on-vehicle device 61 displays the received accident occurrence prediction area map on a liquid crystal display panel of the on-vehicle device 61 and performs notification to a vehicle 6 having the on-vehicle device 61 mounted thereon." is described as a resolving means.

CITATION LIST

Patent Literature

PTL 1: JP 2010-287093 A
PTL 2: JP 2010-211301 A

SUMMARY OF INVENTION

Technical Problem

In the course generation of PTL 1, for a generation method of a trajectory securing safety, a method of securing the safety by negative evaluation in particular is described. However, an operation when a failure occurs in a recognition device is not described.

In addition, in PTL 2, a method of determining a risk position when communication is interrupted and generating a warning is described. However, a generation method of a trajectory securing safety when a failure occurs in a recognition device mounted on a vehicle is not described.

The present invention has been made in view of the above circumstances and provides a method of enabling a vehicle system to take a safe action, even when a failure occurs in a recognition device and outside-world information cannot be acquired.

Solution to Problem

To solve the above problem, an embodiment of the present invention may use a technical spirit described in claims, for example.

ADVANTAGEOUS EFFECTS OF INVENTION

According to the present invention, even when a failure occurs in a recognition function of a vehicle system, the vehicle system can take a safe action. Particularly, even when a dynamic object exists until a point of time of occurrence of the failure in a failure occurrence range of a recognition device, an action such as predicting an action, maintaining a safe state, and delivering an operation to a user is enabled.

In addition, according to a different embodiment, action prediction of surrounding dynamic objects (a vehicle, a two-wheeled vehicle, and a pedestrian) is performed, so that action can be taken when the failure occurs in the recognition function.

In addition, according to a different embodiment, action planning and control are performed such that the dynamic object is hard to enter an area where the failure occurs. As a result, the risk of the dynamic object entering the failure occurrence range of the vehicle can be avoided.

In addition, according to a different embodiment, even when the dynamic object enters from a dead angle range of the recognition device as a result of the occurrence of the failure, a safe action can be taken.

In addition, according to a different embodiment, when there is a recognition device recognizing the same range as the failure occurrence range, a result of prediction based on past information of the recognition device in which the failure occurs and a recognition result of a normal recognition device are superimposed. As a result, the existence probability of an obstacle can be acquired with high precision.

In addition, according to a different embodiment, in the case where the failure occurs in the recognition device when a traffic lane change operation is executed, an action according to the failure occurrence range of the recognition device and a current control state is taken. As a result, a safe action can be taken.

BRIEF DESCRIPTION OF DRAWINGS

FIGS. 17A to 17C illustrate an example of an outside-world recognition map and trajectory generation at the time of failure occurrence in accordance with a fifth embodiment of the present invention.

DESCRIPTION OF EMBODIMENTS

Hereinafter, preferred embodiments of the present invention will be described. This embodiment mainly describes an action planning device of a vehicle control system in a vehicle system and is suitable for execution in the vehicle system. However, this embodiment does not disturb an application to any system other than the vehicle system.

First Embodiment

<Configuration of Vehicle Control System>

Figure 2:
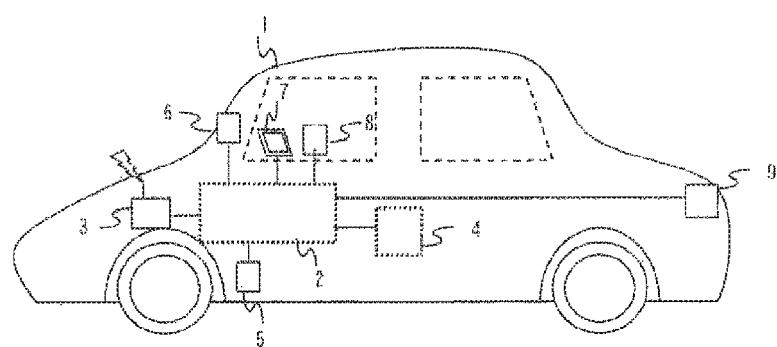
FIG. 2 illustrates an example of a system.

FIG. 2 illustrates an outline of a system having an action planning device according to this embodiment. 1 shows a vehicle system having a vehicle control system in a vehicle. 2 shows a vehicle control system configured using an on-vehicle network (CAN: Controller Area Network, CANFD: CAN with Flexible Data-rate, and Ethernet (registered trademark)) and a controller (ECU: Electronic Control Unit), for example. 3 shows a communication device that performs wireless communication (for example, communication of a mobile phone and communication using protocols of a wireless LAN and a WAN) with the exterior of the vehicle system 1, performs wireless communication to acquire or transmit information regarding an outside world (infrastructures and other vehicles) or information regarding an own vehicle, performs wired connection with a diagnostic terminal (OBD), an Ethernet terminal, and an external recording medium (for example, a USB memory and an SD card) terminal, and performs wired communication with the vehicle control system 2. 4 shows a vehicle control system configured using a network using a protocol different from or equal to a protocol of the vehicle control system 2. 5 shows a drive device such as an actuator that drives mechanical and electrical devices (for example, an engine, a transmission, a wheel, a brake, and a steering device) to control a vehicle motion, according to control of the vehicle control system 2. 6 shows a recognition device that is configured using outside-world sensors such as a camera, a radar, LIDAR, and an ultrasonic sensor to acquire information input from the outside world and generate outside-world recognition information to be described below and dynamic system sensors (acceleration, wheel speed, and GPS: Global Positioning System) to recognize a state (a motion state and a position state) of the vehicle system 1. 7 shows an output device such as a liquid crystal display, a warning light, and a speaker that is connected to a network system by wire or wireless, receives data transmitted from the network system, and displays or outputs necessary information such as message information (for example, video and audio). 8 shows an input device such as a steering, a pedal, a button, a lever, and a touch panel to generate an input signal to allow a user to input an intention or an instruction of an operation to the vehicle control system 2. 9 shows a notification device such as a lamp, an LED, and a speaker to allow the vehicle system 1 to notify the outside world of a state of the vehicle.

The vehicle control system. 2 is connected to the vehicle control system 4, the communication device 3, the drive device 5, the recognition device 6, the output device 7, the input device 8, and the notification device 9 and performs transmission and reception of individual information.

Figure 3:
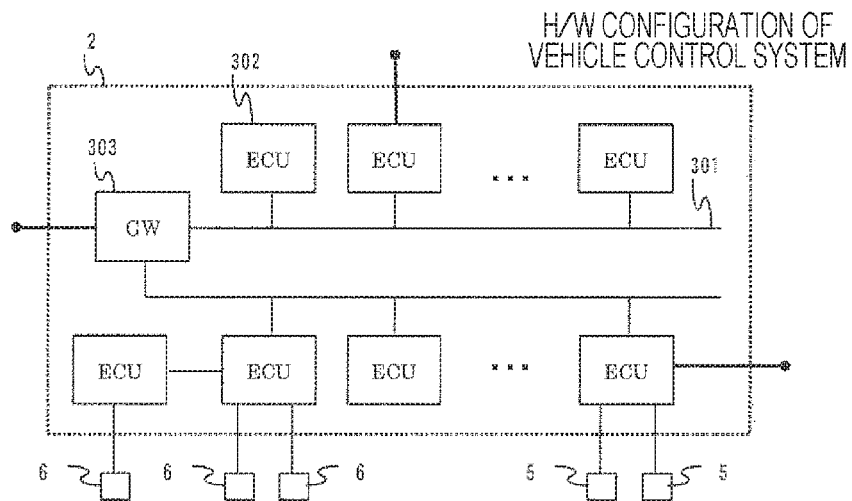
FIG. 3 illustrates an example of an internal configuration of a vehicle control system.

FIG. 3 illustrates a hardware (H/W) configuration example of the vehicle control system 2. 301 shows a network link that connects network devices on an on-vehicle network. As an example of the network link 301, there is a network link such as a CAN bus. 302 shows an ECU that is connected to the network link 301, the drive device 5, the recognition device 6, and a network link (including a dedicated line) other than 301 and controls the drive device 5 or the recognition device 6, acquires information, and performs transmission and reception of data with the network. 303 shows a gateway (hereinafter, referred to as the GW) that connects a plurality of network links 301 and performs transmission and reception of data with the individual network links 301.

In this embodiment, a bus-type network topology in which a plurality of ECUs 302 are connected to two buses is described. However, a star-type network topology in which the plurality of ECUs 302 are connected in series to the GW 303, a link-type network topology in which the ECUs 302 are connected to a series of links in a ring shape, or a mix-type network topology in which individual types are mixed and which is configured using a plurality of networks can be adopted. For the GW 303 and the ECU 302, an ECU having a GW function and a GW having a function of the ECU exist.

The ECU 302 executes control processing such as an output of a control signal to the drive device 5, acquisition of information from the recognition device 6, an output of a control signal and information to the network, and a change of an internal state, on the basis of data received from the network.

Figure 4:
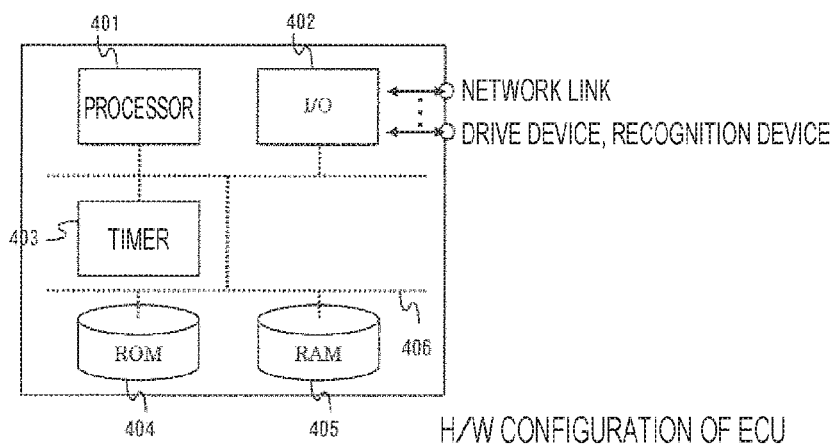
FIG. 4 illustrates a configuration example of a controller.

FIG. 4 illustrates an example of an internal configuration of the ECU 302 or the GW 303 to be a network device according to the present invention. 401 shows a processor such as a CPU that has a storage element such as a cache and a register and executes control. 402 shows an input/output (I/O) that performs transmission and reception of data to the network link 301 or the drive device 5 or/and the recognition device 6 connected by a network or a dedicated line. 403 shows a timer that performs management of time using a clock not illustrated in the drawings. 404 shows a read only memory (ROM) that stores a program and non-volatile data. 405 show a random access memory (RAM) that stores volatile data. 406 shows an internal bus that is used for communication in the ECU.

Figure 5:
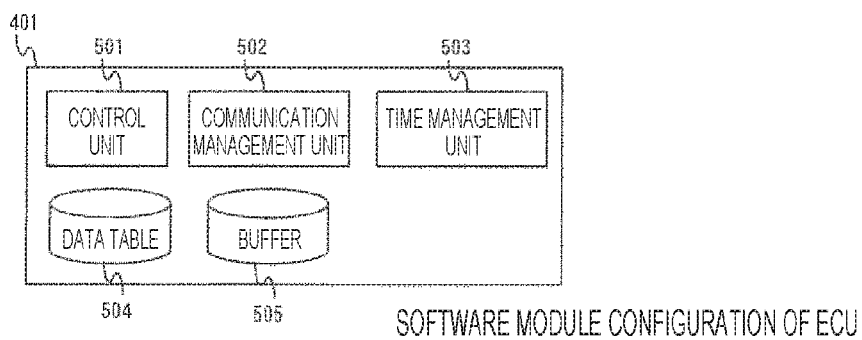
FIG. 5 illustrates an example of a software module configuration of a controller.

Next, a configuration of a software module operated by the processor 401 is illustrated in FIG. 5. 502 shows a communication management unit that manages an operation and a state of the I/O 402 and sends an instruction to the I/O 402 via the internal bus 406. 503 shows a time management unit that manages the timer 403 and performs information acquisition or control for the time. 501 shows a control unit that performs analysis of data acquired from the I/O 402 or whole control of the software module. 504 shows a data table that holds information such as an outside-world recognition map to be described below. 505 shows a buffer that temporarily secures data.

For the configuration of FIG. 5, an operation concept on the processor 401 is illustrated. Information necessary for the operation is appropriately acquired from the ROM 404 and the RAM 405 or is appropriately written to the ROM 404 and the RAM 405 and the operation is executed.

Each function of the vehicle control system to be described below is executed by the control unit 501.

<Functional Configuration Example of Vehicle Control System>

Figure 6:
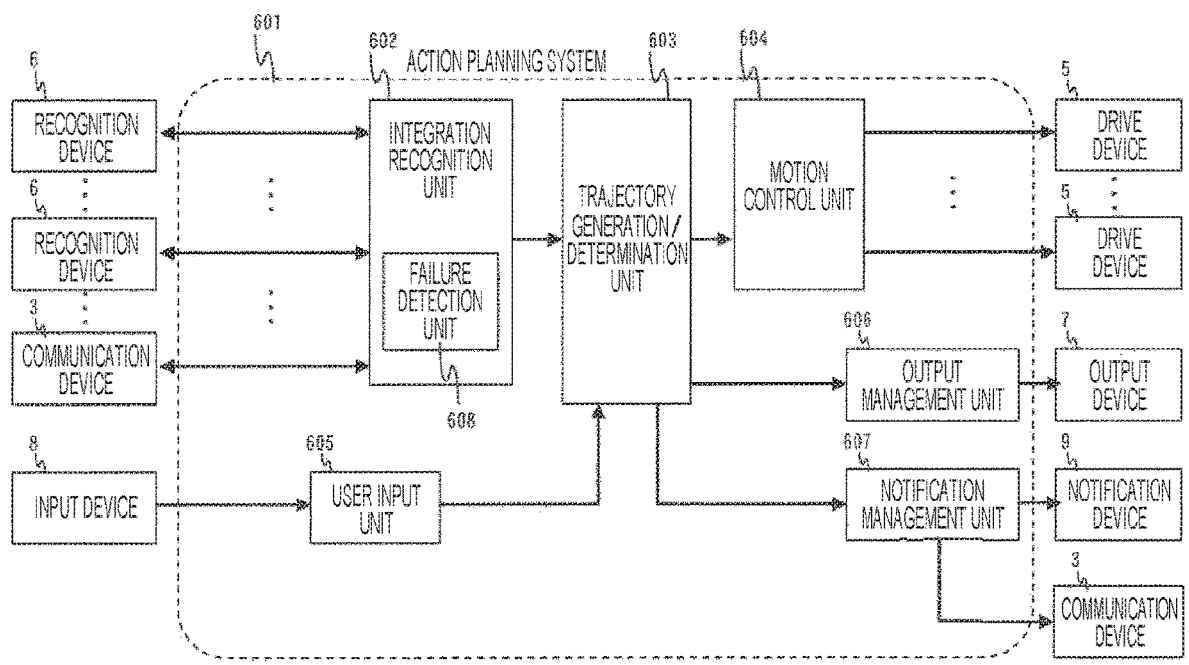
FIG. 6 illustrates a configuration example of an action planning system.

A functional configuration example of the vehicle control system is illustrated in FIG. 6.

601 shows an entire portion of an action planning system according to the present invention. 602 shows an integration recognition unit that integrates outside-world recognition information output from the plurality of recognition devices 6, generates an outside-world recognition map to be described below, has a failure detection unit 608 to be described below, and generates the outside-world recognition map at the time of occurrence of a failure to be described below. 603 shows a trajectory generation/determination unit that performs determination from the outside-world recognition map generated by the integration recognition unit 602 and an input of a user input from a user input unit 605, generates a trajectory, sends a motion control instruction to a motion control unit 604, sends an output instruction to an output management unit 606, and sends a notification instruction to a notification management unit 607. 604 shows a motion control unit that controls the plurality of drive devices 5, according to the motion control instruction from the trajectory generation/determination unit 603. 605 shows a user input unit that generates instruction information of the user, according to an input from the input device 8. 606 shows an output management unit that sends an output instruction to the output device 7, according to an output of the trajectory generation/determination unit 603. 607 shows a notification management unit that sends a notification instruction to the notification device 9, according to the output of the trajectory generation/determination unit 603. 608 shows a failure detection unit that detects a failure occurring in the recognition device 6 or a failure occurring in a communication path between the recognition device 6 and the integration recognition unit 602.

All or any combination of the integration recognition unit 602, the trajectory generation/determination unit 603, the motion control unit 604, the user input unit 605, the output management unit 606, and the notification management unit 607 is called an action planning system and a part or all of the drive device 5, the recognition device 6, the output device 7, the input device 8, and the notification device 9 may be included in the action planning system.

Figure 7:
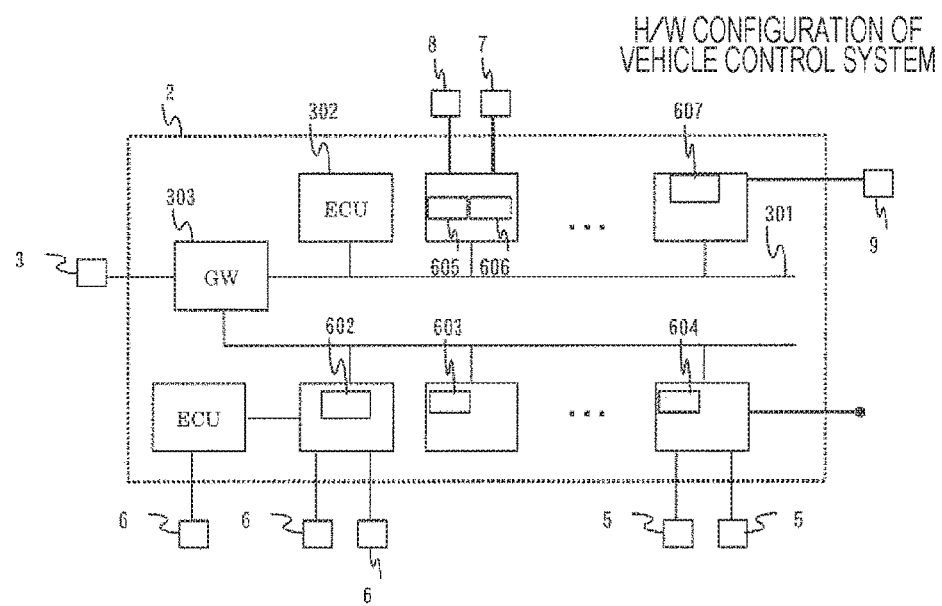
FIG. 7 illustrates an arrangement example of an action planning system in a vehicle control system.

The action planning system 601 is configured using a plurality of functions and a plurality of patterns exist in an arrangement of functions in the H/W illustrated in FIG. 3. An example of the arrangement is illustrated in FIG. 7. The arrangement of the functions is not limited thereto and the individual functions may be disposed in ECUs different from the ECUs described. For example, the integration recognition unit 602 and the trajectory generation/determination unit 603 may be disposed in the same ECU. The functions are disposed in the same ECU, so that communication between the functions is facilitated, and high-speed processing can be realized. In addition, the functions are disposed in the different ECUs, so that the individual functions are protected from the risk of a common cause failure by an H/W failure, and high reliability can be realized. The individual functions will be described below.

<Outside-World Recognition Method>

The kinds of the recognition devices 6 are as described in the configuration of the vehicle control system and outside-world recognition information to be described below is acquired by the operation principle according to the kind of each recognition device. Mainly, sensors of the recognition device 6 acquire physical measurement values of the outside world, apply a specific algorithm (for example, an image recognition algorithm for an acquired image) to the measurement values, and acquire outside-world information.

For each recognition device 6, a measurable range is previously determined. For example, in the case of a camera, a recognition limit of a distant distance is determined by a photographing direction, vertical/horizontal angles, and the number of pixels. Meanwhile, in the case of radar, a radiation angle and a reception angle of radio waves and a distance are determined. In addition, the measurable range is measured by adjusting (calibrating) a change according to an environment and the measurable range of the recognition device 6 is determined. An outside-world situation of the vehicle system 2 can be confirmed by combining the outside-world information acquired by the individual recognition devices 6.

Figure 8:
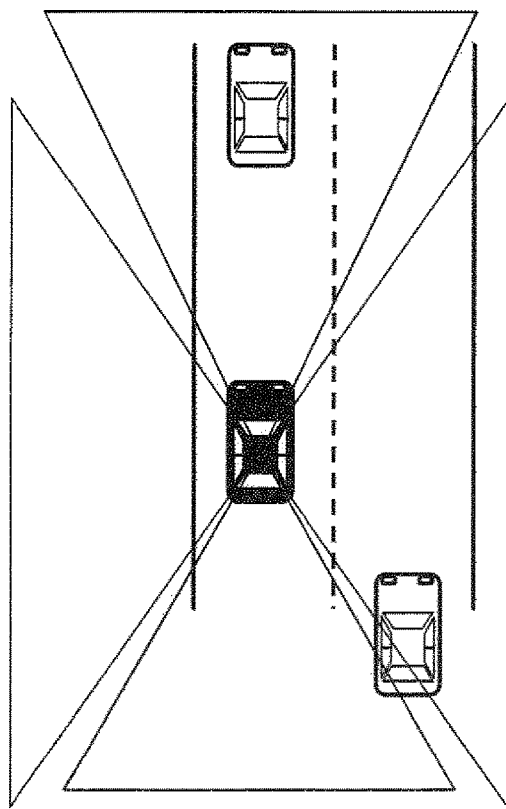
FIG. 8 illustrates an example of outside-world recognition.

An example of the outside-world recognition is illustrated in FIG. 8. Here, an example of the case where the recognition devices 6 disposed in four directions of the vehicle system 1 acquire the outside-world information is illustrated. From the outside-world recognition information output from the recognition devices 6, the integration recognition unit 602 can confirm an object existing around the vehicle.

The outside-world recognition information can be acquired equally from the communication device 3. The information acquired from the communication device 3 is mainly information that cannot be observed by the recognition device 6, for example, outside-world recognition information and position information of an object existing at an opposite side of a shield material such as a shade. The vehicle system 1 can confirm a position where the object exists, using the information acquired from the communication information 3.

In the outside-world recognition, the recognition devices 6 cannot surely recognize all objects and there is an area (undecided area) where an existing object is undecided. In this case, uncertainty and reliability of existence of an object are expressed by the existence probability to be described below.

<Outside-World Recognition Information>

The outside-world recognition information becomes information that expresses objects existing at the exterior of the vehicle system and observed by the recognition device. Examples of the outside-world recognition information include types of objects (stationary objects (walls, dividing lines, signals, separation zones, tree, or the like), dynamic objects (pedestrians, vehicles, two-wheeled vehicles, bicycles, and the like), whether running (area entry) is enabled, and other attribution information), relative position information (directions/distances) of objects, absolute position information (coordinates and the like) of the objects, speeds, directions (movement directions and face directions), accelerations, and existence probabilities (likelihoods) of the objects, measurement time of the outside-world recognition information, IDs of recognition devices executing measurements, and the like.

As a calculation method of the existence probability, there is a method of increasing the probability at the time of determination as likelihood, including a time-series observation result (the same type of object exists at the same position in short time) in addition to an operation result of the probability by an object determination algorithm in the recognition device 6. In this way, the possibility that the object can be correctly determined by the observed outside-world recognition information can be increased.

In addition, measurement time of the outside-world recognition information is held, so that an outside-world recognition map where a plurality of outside-world recognition information is synchronized temporally can be generated. Even in the case where a failure has occurred in the recognition device 6, when the outside-world recognition information is not updated thereafter, a final state (a final position and a final observation time) before the failure occurs is grasped and the following action can be predicted. When the failure occurrence time of the recognition device 6 is known, only the outside-world recognition information before the failure occurs in the outside-world recognition information generated by the recognition device 6 in which the failure has occurred can be trusted.

In addition, a recognition device ID showing the recognition device 6 having generated respective outside-world recognition information is included in respective outside-world recognition information. As a result, when the failure has occurred in any recognition device, it can be confirmed which outside-world recognition information is output from the recognition device in which the failure has occurred.

<Outside-World Recognition Map>

Figure 9A:
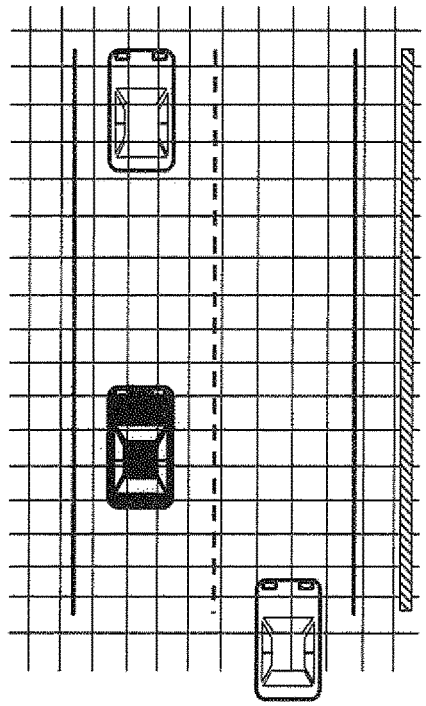
FIGS. 9A and 9B illustrate an example of an outside-world recognition map.
Figure 9B:
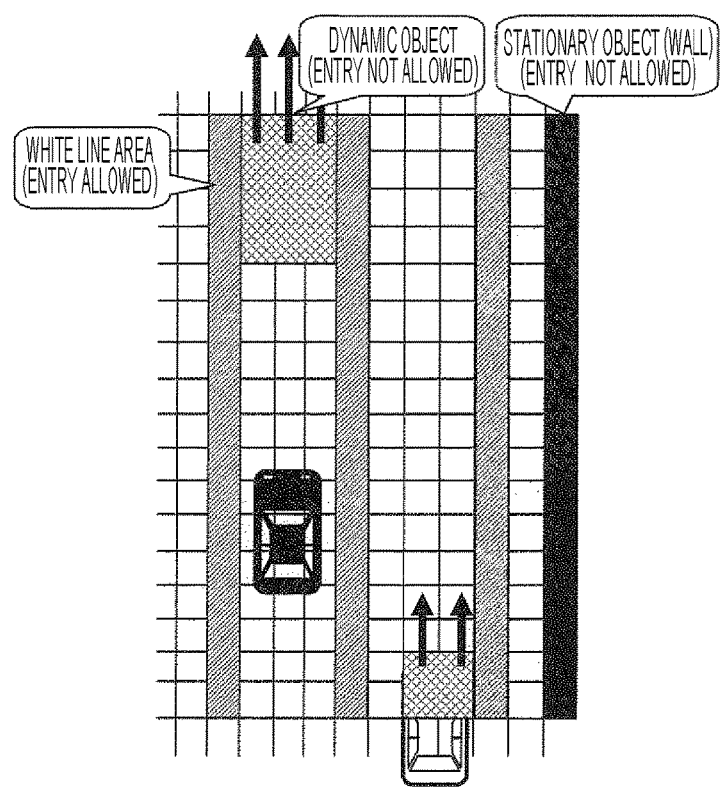

The integration recognition unit 602 generates integration recognition information (example: outside-world recognition map) obtained by integrating the outside-world recognition information received from the plurality of recognition devices 6. An example of the outside-world recognition map is illustrated in FIGS. 9A and 9B. Here, an example of the case where object information is disposed for each area with respect to an orthogonal coordinate system (grid) (FIG. 9A) is illustrated in FIG. 9B. The object information is content in the case of removing position information from the example of the outside-world recognition information and is disposed in each grid.

In the case where a plurality of object information exist in the same grid (for example, in the case where a plurality of recognition devices observe a position of the same grid), for example, when recognition is enabled from the plurality of recognition devices, the existence probability is increased and when recognition is disabled from the plurality of recognition devices observing the same grid, the existence probability is decreased. As a result, precision of the recognition can be improved. When information is mismatched, the outside-world recognition information having the high probability is preferentially used and the existence probability of the object information in the grid is decreased. Thereby, when different information is recognized by the plurality of recognition devices 6, the existence probability is decreased and reliability of the object information can be decreased.

Figures 10, 11:
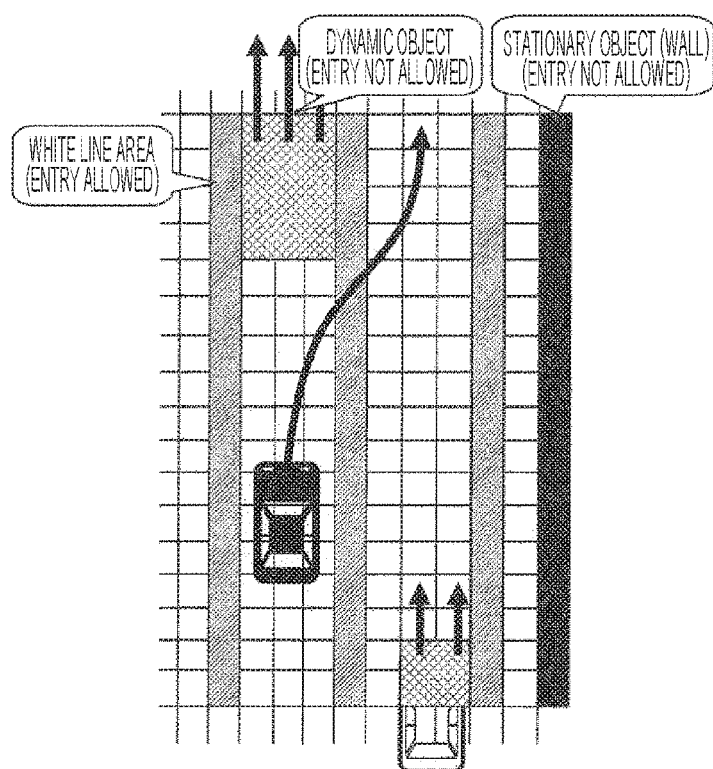
FIG. 10 illustrates an example of a list type of an outside-world recognition map.
FIG. 11 illustrates an example of trajectory generation based on outside-world recognition map information.

As a different expression of the outside-world recognition map, there is a list-type method for performing listing for each recognized object, in addition to a notation using the grid. An example of a list-type notation is illustrated in FIG. 10. 1001 shows the entire outside-world recognition map by list display. As such, the outside-world recognition map is held in the list type, so that a data amount can be reduced as compared with the grid type.

<Action Prediction>

The outside-world recognition map can be generated by performing prediction (action prediction) from past outside-world recognition information as well as the entire outside-world recognition information observed at the present time. For example, in the case of a stationary object, the stationary object is likely to exist at the same position (the same position on a road surface, not a relative position with a vehicle) after constant time passes and in the case of a dynamic object, a position after the constant time can be predicted from immediately previous position, speed, and acceleration. As such, the predicted outside-world recognition information is used, so that information of a position where an observation is disabled at the present time can be predicted.

The integration recognition unit 602 can perform the action prediction on the basis of the outside-world recognition map. However, the recognition device 6 may add future prediction information to the outside-world recognition information, may transmit the outside-world recognition information, and may notify the integration recognition unit 602 of the outside-world recognition information. In this case, each recognition device 6 performs prediction and an operation amount associated with the action prediction of the integration recognition unit 602 can be reduced. In a different method, the trajectory generation/determination unit 603 may perform action prediction of a necessary object from a current outside-world recognition map. In this way, a communication load from the integration recognition unit 602 to the trajectory generation/determination unit 603 can be reduced and action prediction of only an object necessary for generating and determining the trajectory can be performed.

<Trajectory Generation>

A trajectory generation method based on the outside-world recognition map will be described. The trajectory is generated to satisfy safety restrictions in which the vehicle system 1 can run safely (example: the possibility of colliding with other obstacle is low) and motion restrictions to be acceleration, deceleration, and a yaw rate which the vehicle system 1 can realize.

In the outside-world recognition map of the example of FIG. 9(*b*), a generation example of a trajectory where an own vehicle moves to a right traffic lane will be described using FIG. 11. Here, an example of the case where a running vehicle exists on the right traffic lane, but a speed of the own vehicle is higher than a speed of the running vehicle and a traffic lane can be changed is illustrated. First, the own vehicle generates a trajectory that satisfies the motion restrictions and moves to the right traffic lane. Then, occurrence or non-occurrence of collision by a prediction trajectory (for example, a position after constant time at a current speed and assumed acceleration) of other dynamic object and the trajectory of the own vehicle is calculated for the generated trajectory. When non-occurrence of the collision is calculated, the own vehicle is controlled on the basis of the trajectory of the own vehicle. When occurrence of the collision is calculated, recalculation is performed after constant standby time or a different trajectory satisfying the motion restrictions is generated and the safety restrictions are calculated in the same way.

Calculation methods of the safety restrictions include a potential map method of calculating a risk of each area from a type, a speed, and a movement direction of each object and calculating risk potential, in addition to a method (entry prohibition area method) of setting an area assumed from the current speed and the assumed acceleration/deceleration of the dynamic object as an entry prohibition area, as described above. When the potential map method is used, trajectories having lowest potential and not entering a potential area of a constant value or more in a generated potential map are generated and a trajectory satisfying the motion restrictions of the own vehicle is set as a generated trajectory.

For the entry prohibition area, the action prediction of the dynamic object is necessary. For the action prediction, there is a method of setting a constant area based on a movement point of the dynamic object at the current speed/acceleration and in the current direction as the entry prohibition area. As such, the constant area is set as the entry prohibition area, so that an operation by complex prediction becomes unnecessary.

As such, the trajectory is generated on the basis of the movement direction of the vehicle, the motion restrictions, and the safety restrictions, the trajectory generation/determination unit 603 transmits the trajectory information to the motion control unit 604 on the basis of the generated trajectory, and the motion control unit 604 controls the drive device 5 on the basis of the trajectory information and controls the motion of the vehicle system 1.

<Failure Determination>

A determination method of the failure occurrence will be described. The integration recognition unit 602 performs communication with the recognition devices 6 via a network or a communication path such as a dedicated line and determines presence/absence of the failure in the communication. For a failure of the communication path, the failure of the communication path can be determined by non-performance of communication (error response of communication processing and abnormality of a potential of a signal line) and abnormality of a signal value of the communication (example: mismatching of CRC and mismatching of a fixed data pattern). For the failure of the communication path, a communication path other than the communication path to transmit the outside-world recognition information is further provided and occurrence of the failure of the communication path to transmit the outside-world recognition information can be notified by the path.

In addition, examples of the failure of the recognition device 6 include non-arrival of data transmitted at a constant cycle, late arrival of the data, non-reception of a fixed data pattern (a head bit is always 1 and CRC is mismatched), and non-response for a request for data transmission.

In addition to the determination method, the failure can be determined on the basis of the behavior of transmitted data. For example, for the outside-world recognition information, when the object executes a non-assumed operation (a result not assumed as an output of the recognition device 6, for example, acquisition of information moving at a movement speed beyond a physical limit of an object type), when an object beyond a probability range appears or disappears, or when a non-regulated parameter is acquired, that is, when abnormality occurs in the behavior, the recognition device 6 having outputted the outside-world recognition information of the object having the abnormal behavior is handled as a recognition device in which the failure has occurred and determination of a failure range to be described below is performed.

In addition, the recognition device 6 may notify the integration recognition unit 602 that the recognition device 6 has failed. Particularly, when a failure of a recognition function of a specific area (abnormality of a sensor device) has occurred and when the recognition device 6 can determine the failure, the recognition device 6 can transmit that the specific area has failed. In this case, the specific area can be used for the determination of the failure range to be described below.

By a failure determination result, the recognition device 6 in which the failure occurs can be determined and a failure occurrence range in which recognition is disabled can be specified.

Particularly, when the occurrence of the failure is detected by the behavior, as failure occurrence time, it is determined that the failure occurs before receiving the outside-world recognition information in which the behavior is abnormal and the following outside-world recognition information is discarded not to be used for control of the vehicle system 1. As a result, incorrect trajectory generation by incorrect outside-world recognition information after the occurrence of the failure can be prevented.

For the failure occurrence time of the recognition device 6, it may be assumed that the failure occurs before constant time from the failure detection and processing may be executed, at the time of a design. For example, detection time of the failure by the failure determination method (for example, interruption of communication) is set as T, T-a (a is a design value: for example, assumption time until the communication is interrupted after the failure occurs) is set as the failure occurrence time, and outside-world recognition information output from the recognition device 6 in which it is recognized that the failure has occurred after the failure occurrence time is completely discarded. As a result, time until the recognition device 6 detects the occurrence of the failure and performs the notification can be increased (a failure detection processing load decreases) and the integration recognition unit 602 can be prevented from executing processing on the basis of erroneous outside-world recognition information.

<Trajectory Generation Flow Based on Failure Occurrence State>

Figure 1:
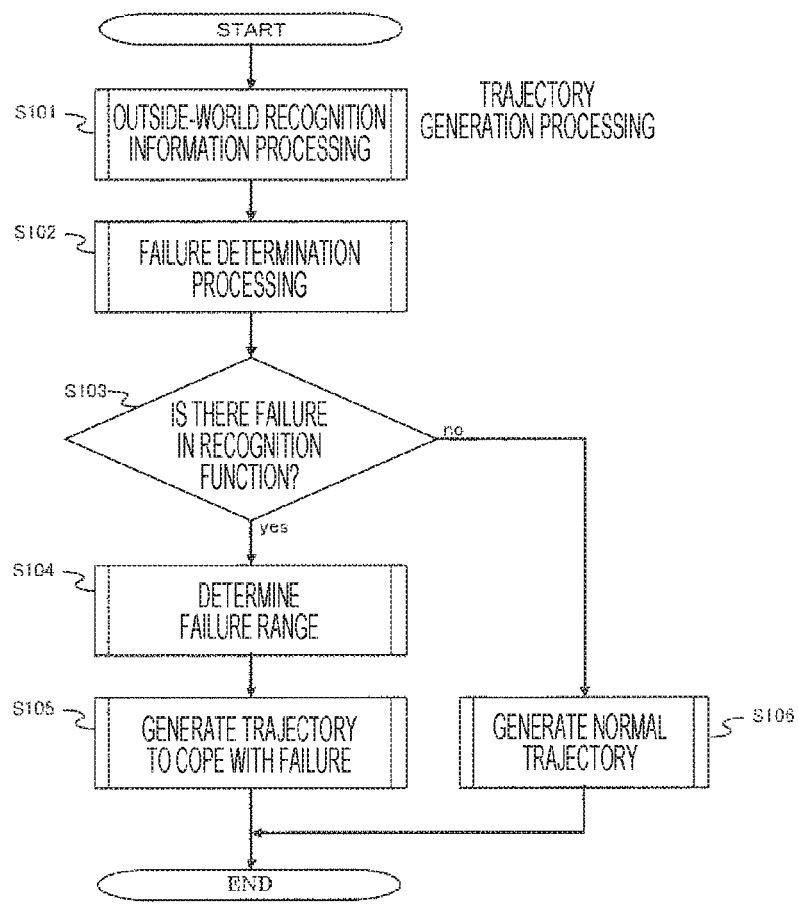
FIG. 1 is a flowchart illustrating trajectory generation processing in an action planning system.

A trajectory generation method of the action planning system 601 according to the present invention based on the failure occurrence state will be described using FIG. 1.

The integration recognition unit 602 acquires the outside-world recognition information from the recognition device 6 (S101). After S101 or at the same time, failure determination is performed and it is determined whether a failure occurs in the recognition device 6 or a communication path with the recognition device 6 (there is a failure in a recognition function) (S102). When it is determined that there is no failure in the recognition function, on the basis of S102 (no of S103), as usual, trajectory generation processing is executed. For this reason, the integration recognition unit 602 generates an outside-world recognition map from the outside-world recognition information and transmits the outside-world recognition map to the trajectory generation/determination unit 603. The trajectory generation/determination unit performs trajectory generation by the trajectory generation method, on the basis of the outside-world recognition map (S106). Meanwhile, when it is determined that the failure occurs in the recognition function, on the basis of S102 (yes of S103), the integration recognition unit 602 determines a failure occurrence range by a mechanism described in the failure determination method and generates an outside-world recognition map including the failure range (S104). After S104, the integration recognition unit 602 transmits the generated outside-world recognition map to the trajectory generation/determination unit 603. The trajectory generation/determination unit 603 generates a trajectory to cope with the failure of the recognition function by a method of generating a trajectory to cope with the failure to be described below, on the basis of the outside-world recognition map received from the integration recognition unit 602 (S105). In this way, when the failure occurs in the recognition function, a trajectory based on the failure range of the recognition function can be generated.

Here, for the failure occurrence range, outside-world recognition information after failure occurrence time is discarded and the outside-world recognition information is not used in trajectory generation based on a failure generation state, so that the trajectory can be avoided from being generated erroneously on the basis of the outside-world recognition information after the failure occurrence.

<Generation of Trajectory to Cope with Failure>

A specific example of an outside-world recognition map at the time of occurrence of a failure is illustrated in FIGS. 12A to 12D. Here, an example of the case where a failure occurs in the recognition device 6 monitoring a right side of the vehicle system is illustrated (a shaded portion of FIG. 12A). In this case, because there is a dynamic object observed before failure occurrence in a failure occurrence area, for an action thereof, action prediction from a point of time of final observation before the failure occurrence is performed and a trajectory to enter a safe state when the failure occurs to be described below is generated on the basis of an outside-world recognition map including a result of the action prediction of the failure occurrence range.

As an example of a trajectory generated by the trajectory generation/determination unit, because a failure does not occur at a front side, a trajectory to move to the front side is generated or because a failure does not occur in the recognition device of the left side, a trajectory to move to the left side, confirm a safe area where there is no obstacle, and stop at the safe area is generated.

Figure 12A:
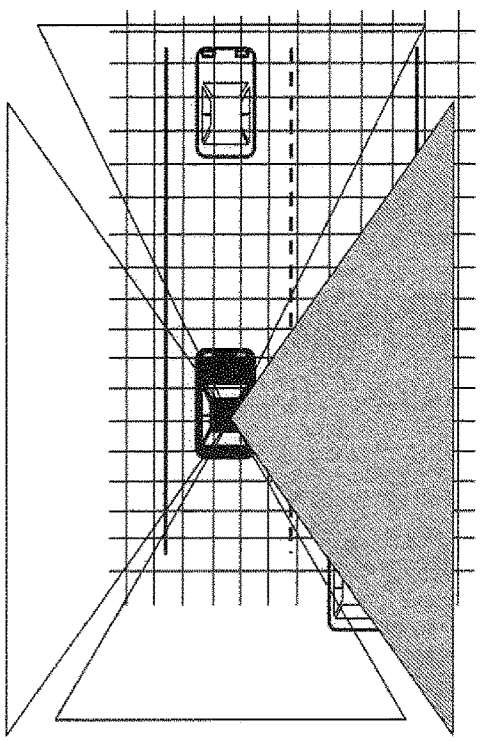
FIGS. 12A to 12D illustrate an example of an outside-world recognition map and trajectory generation at the time of failure occurrence.
Figure 12B:
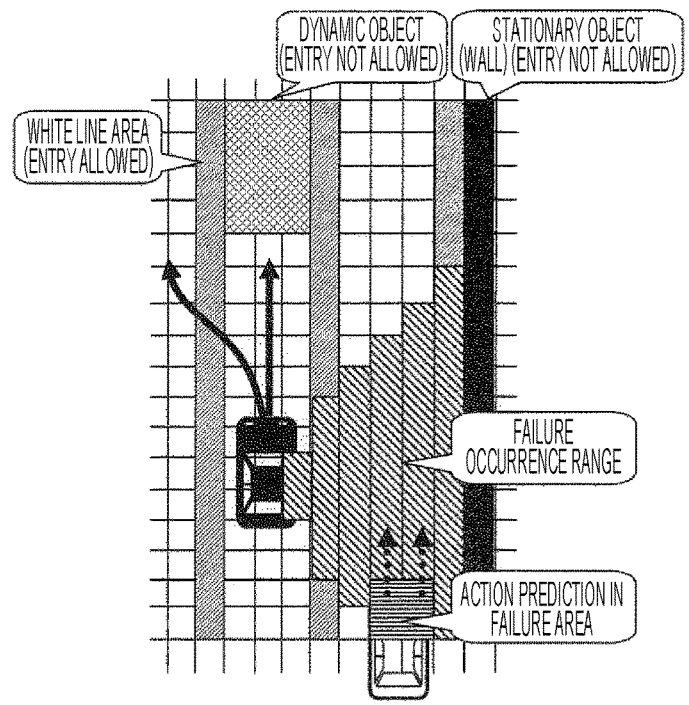
Figure 12C:
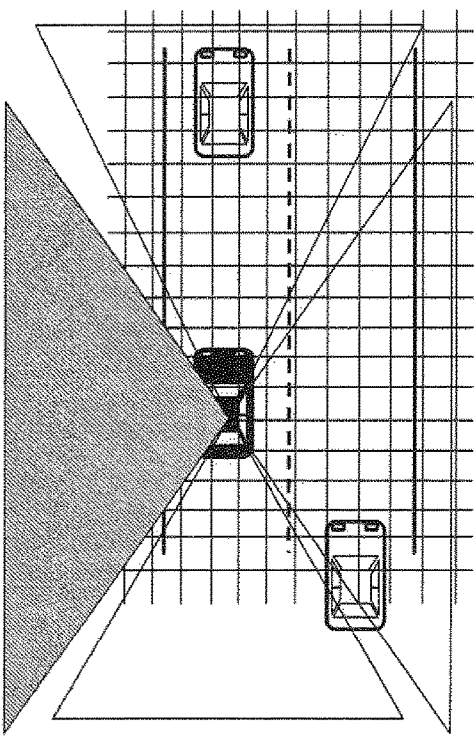
Figure 12D:
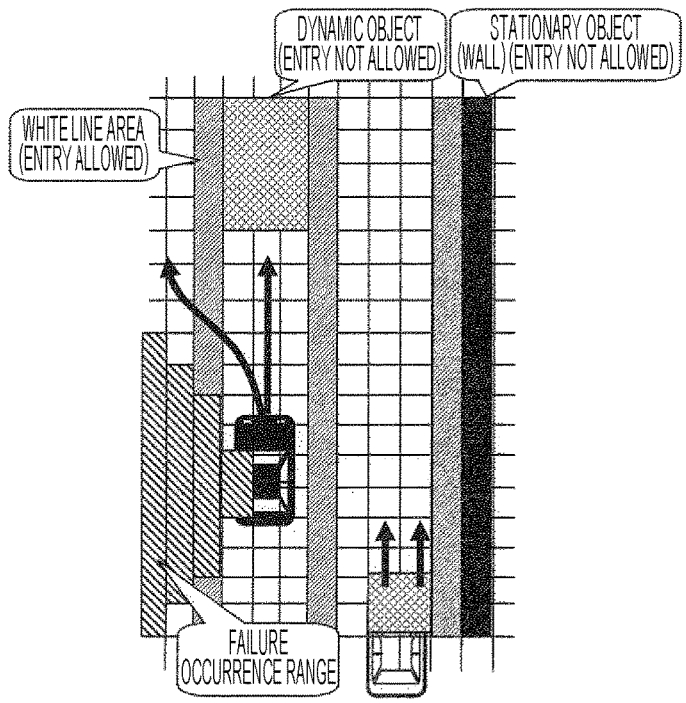

Likewise, an operation of the case where a failure occurs in the recognition device of the left side of the vehicle is illustrated in FIG. 12(c). Here, the case where the left side of the vehicle cannot be recognized is illustrated. Even in this case, a trajectory to enter a safe state when a failure occurs to be described below is generated in the same way. For example, because a failure does not occur at a front side, a trajectory to move to the front side is generated or because there is no dynamic object before the failure occurrence in a failure occurrence range of the recognition device of a left side, the left side is determined as safe and a trajectory to move to the left side, confirm a safe area where there is no obstacle, and stop at the safe area is generated. In this way, generation of a trajectory to cope with the failure occurrence range is performed, the risk existing in the failure generation range is avoided, and a safe operation can be executed in a confirmable range.

Here, an example of a grid type is illustrated as an expression method of the failure occurrence range. However, even in a list type, a type of an object is set as a failure range and a range is set as a range where a failure occurs, so that the failure occurrence range can be expressed in the same way.

For the outside-world recognition map after the failure occurrence, information is updated whenever constant time passes, the action prediction of the dynamic object existing in the failure occurrence range is performed, the information is combined with the outside-world recognition information output from the normal recognition device, and an outside-world recognition map is generated again on the basis of an action prediction result. In this way, the action of the failure occurrence range after the constant time passes can be predicted again.

<Safe State when Failure Occurs>

An example of a safe state (safe state when a failure occurs) when the failure occurs is illustrated below. Examples of the safe state include a state in which there is not the possibility that collision occurs in a prediction range or control is delivered to a user in a safe state.

As one example, the own vehicle stands still in an area (for example, a road shoulder) where the own vehicle can stop safely, in a range in which recognition and movement of the recognition device 6 having no failure are enabled. The own vehicle stops safely at the exterior of a running traffic lane. Then, the safe state is continuously maintained and control can be delivered to the user according to a situation.

In this case, when the dynamic object exists in a peripheral portion of the own vehicle such as the failure occurrence range and a trajectory to an area where the own vehicle can stand still safely and an action prediction trajectory of the dynamic object cross, a state is not safe and the above action is not performed.

Because the recognition function is lost in the failure occurrence range, it is difficult to decide which obstacle exists. For this reason, it is necessary to cause the own vehicle not to enter the failure occurrence range to maintain the safe state.

As another example of the safe state, an operation is delivered to the user in a state in which a current running state is maintained. As in the examples of FIGS. 12A and 12B, when the front side is recognizable and a straight running state can be continuously maintained, notification to the user to be described below is performed while straight running is continuously performed and control is delivered to the user. This case is also the safe state when the failure occurs.

In this case, the own vehicle is drawn to a traffic lane opposite to a direction in which the failure occurs in the recognition device 6 in a traffic lane to keep away from the dynamic object existing in the failure occurrence range and safety can be increased.

Likewise, deceleration is performed gently while a recognizable range is determined during delivering the operation to the user, so that a speed when collision occurs can be reduced, and safety can be improved.

When the front side can be recognized and a straight path is continued, it is not essential to deliver the operation to the user and the action planning system may execute the control continuously. The operation is delivered to the user only when it is difficult to secure the safety in a state in which the failure occurs in the recognition device, such as entry of the dynamic object in the failure occurrence range, or it will be difficult to secure the safety. In this way, the action planning system can execute long-term control and the load of the user can be alleviated.

For the priority when it is difficult to enter any safe state, the highest priority is given to avoidance of collision in a recognizable range and the second priority is given to collision with a prediction obstacle in the failure occurrence range. That is, when it is determined that it is difficult to enter any safe state, an action to avoid the collision in the recognizable range is taken and an action plan for allowing the collision with the prediction obstacle is made. As a result, an action to avoid collision with a recognizable vehicle can be taken.

<Output Vehicle State to User and Notify Exterior of Vehicle of Vehicle State>

The vehicle control system 3 outputs a current vehicle state to the user via the output device 7 or outputs the current vehicle state to the exterior of the vehicle via the notification device 9 or the communication device 3. For example, when a failure occurs in any portion of the vehicle system 1, lighting such as a warning or a warning using a sound is given to the user via the output device 7. In addition, an output of a warning state using a lamp, an output of a warning sound using a speaker, or an output of information regarding the failure is given to the exterior of the vehicle via the notification device 9 or the communication device 3.

Figure 13:
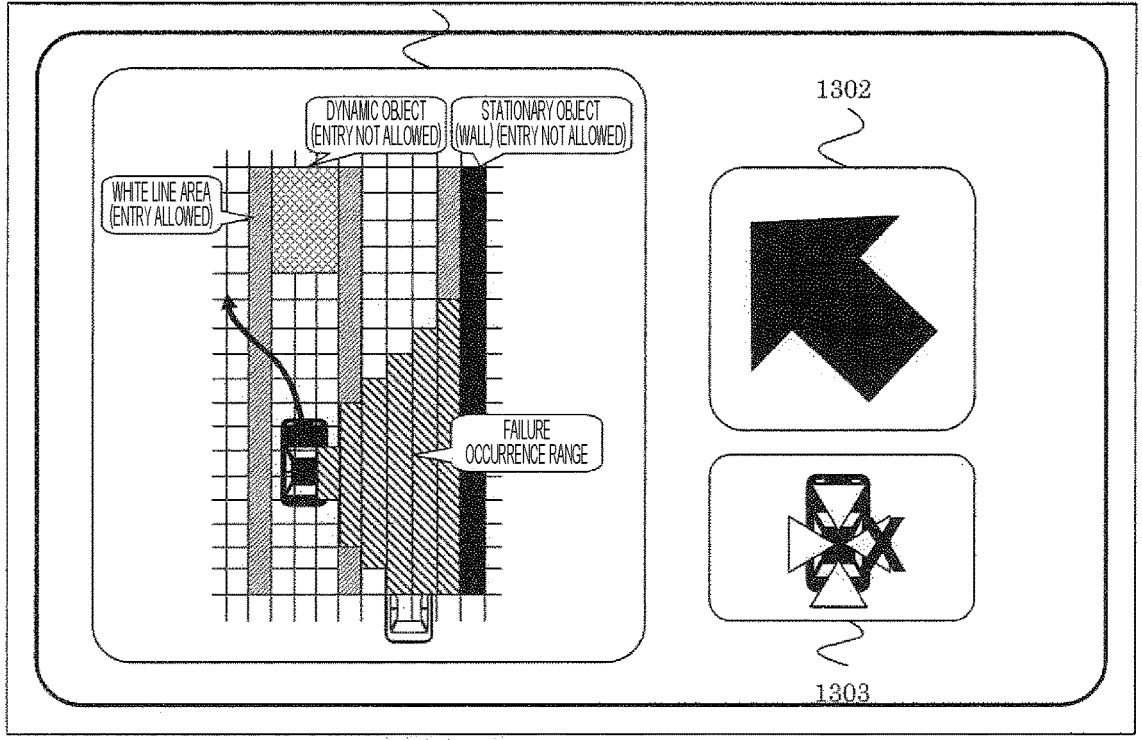
FIG. 13 illustrates an output example by an output device.

When the failure occurs in the recognition device 6, occurrence of the failure is notified to the user by a warning or a sound and a failure range is displayed by a display or a warning light of the output device 7. An output example of the output device 7 is illustrated in FIG. 13. For an output of the display, like an example illustrated in a situation display 1301 of FIG. 13, a failure range is notified and a generated trajectory is displayed, so that a future operation of the vehicle can be notified. As a result, the future action is easily predicted like the case where the control is delivered to the user when the failure occurs and processing can be delivered safely. As a different example, an example of displaying only a latest direction of a trajectory simply such that the user easily view a future trajectory like a course display 1302 or a display example of enabling a failure range to be easily viewed like a failure place display 1303 are enabled. In this way, the user easily assumes the behavior of the vehicle at the time of delivering. The display and the warning sound are output at the same time or flickering display of video is performed, so that the user can easily recognize display of the display device 1300.

For the notification to the exterior of the vehicle, occurrence of the failure in the own vehicle, a failure occurrence range, and a future trajectory direction of the own vehicle are notified via the notification device 9 or the communication device 3 in the same way. In this way, a following vehicle can predict the action of the vehicle system 1 in which the failure has occurred and secondary damage such as collision with the own vehicle can be avoided.

Second Embodiment

An action planning system according to a second embodiment of the present invention will be described. The second embodiment is different from the first embodiment in that highly safe prediction is performed for action prediction of a dynamic object of a failure area performed by an integration recognition unit 602.

Figure 14A:
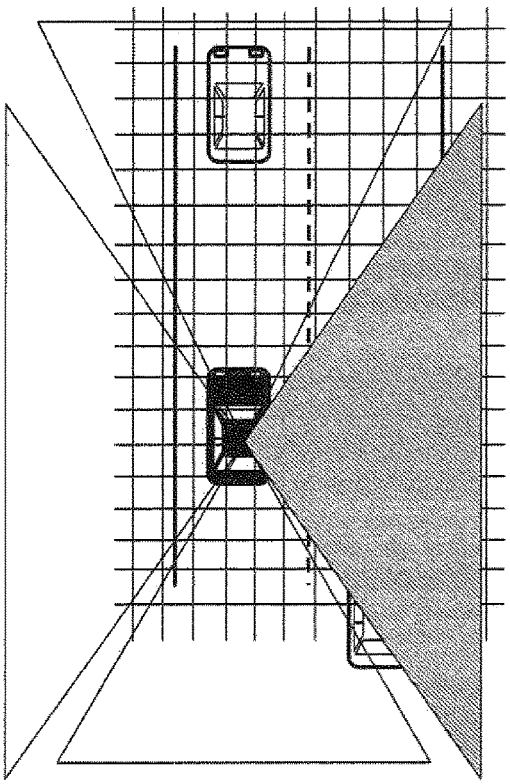
FIGS. 14A and 14B illustrate an example of an outside-world recognition map and trajectory generation at the time of failure occurrence in accordance with a second embodiment of the present invention.
Figure 14B:
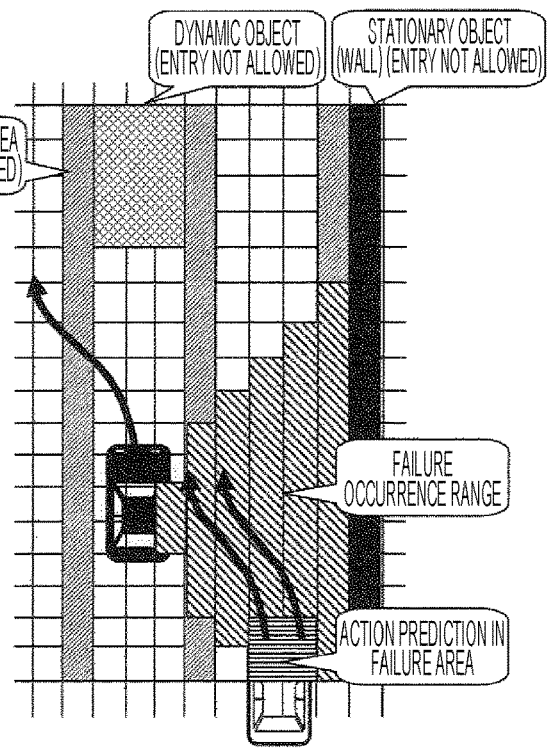

An example of the case where a failure occurs in a recognition device 6 is illustrated in FIGS. 14A and 14B. Here, an example of the case where a failure occurs in a recognition device monitoring a right side of a vehicle is illustrated (FIG. 14A). Here, the integration recognition unit 602 assumes that a dynamic object in a failure occurrence range takes a high-risk action for an own vehicle. In examples of FIGS. 14A and 14B, an action to approach an own vehicle like the case where a vehicle of a rear right side changes a traffic lane to a left side is predicted.

By the action prediction, the own vehicle determines that there is the possibility of collision at the time of going straight and takes an action to move in a leftward direction. As such, prediction of the dynamic object of the failure occurrence range is determined as high risk, so that safety of the own vehicle can be secured in many cases.

Here, for a high-risk action, an action for approaching the own vehicle is main. However, for an approaching method, a physical limit value (speed/acceleration) is assumed and trajectory generation according to action prediction thereof is performed, so that it is possible to take an action not to collide with the own vehicle, as long as a physical value is not more than the physical limit value.

As a different action prediction method, for approaching the own vehicle, an action in a range in which the Road Traffic Law is obeyed is predicted. For example, a speed upper limit of the dynamic object is a regulation speed or an excess of a constant ratio of the regulation speed by a safety avoidance action, required time of a change of a traffic lane of the dynamic object is equal to or more than several seconds including time of a signal, the dynamic object does not run on the exterior of the traffic lane, and the dynamic object does not perform unreasonable passing. As such, action prediction is performed including a situation where the dynamic object is placed, so that an action in which a vehicle obeying the Road Traffic Law does not collide with the own vehicle can be taken, even though the dynamic object exists in the failure range.

As a different action prediction method, a learning result of the past action of the vehicle is used. An action of the dynamic object in the failure range is predicted using behavior data of the vehicle observed by the own vehicle or other vehicle in the past. In this case, an action is planned to avoid an action having the highest risk (approaching the own vehicle in short time) in the vehicle behavior data observed in the past. As such, the action prediction is performed, so that an action in which the vehicle does not collide with the own vehicle can be taken, as long as there is no vehicle taking an action having the higher risk than a vehicle pattern learned in the past, even though the dynamic object exists in the failure range. In addition to using the worst value for the learning result, a mode or an operation pattern of 90% in past learning patterns is determined as safe and the risk is high as compared with the prediction of the worst value, but action prediction that can deal with only a more frequent risk can be performed.

Third Embodiment

An action planning system according to a third embodiment of the present invention will be described. The third embodiment is different from the first embodiment in that a failure occurrence range is recognized and a trajectory generation/determination unit 603 executes trajectory generation processing for avoiding a dynamic object from entering the range by the generation of the trajectory to cope with the failure (S105).

Figure 15A:
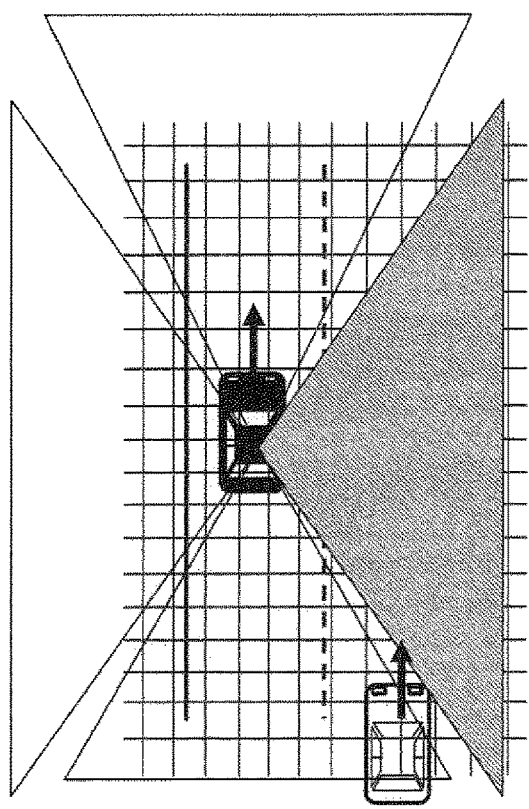
FIGS. 15A and 15B illustrate an example of an outside-world recognition map and trajectory generation at the time of failure occurrence in accordance with a third embodiment of the present invention.
Figure 15B:
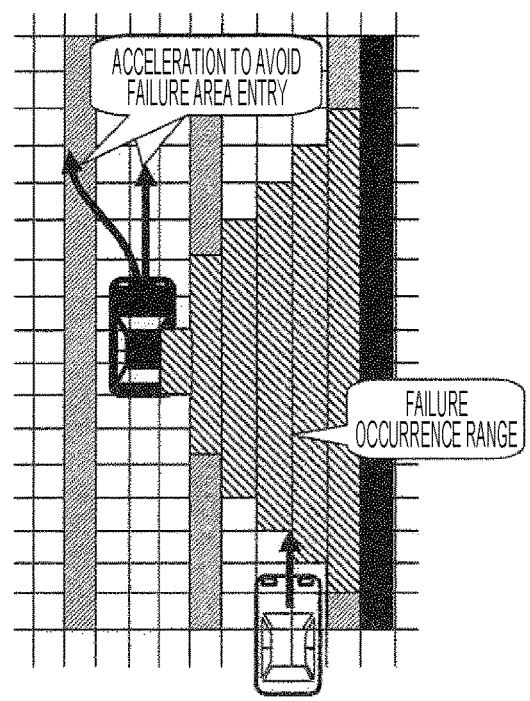

FIGS. 15A and 15B illustrate operation examples when the failure occurs. FIG. 15A illustrates an example of the case where a recognition device of a right side of a vehicle fails and the vehicle runs on a rear side of a failure occurrence range of the right side. In this case, according to the relative speed of an own vehicle and the vehicle of the rear right side, the vehicle may enter a failure occurrence area. To avoid this, control is executed to increase the speed of the own vehicle. When the safe state when the failure occurs can be maintained, the own vehicle moves in an avoidance direction. In this way, the vehicle can be avoided from moving in a dead angle direction and safety can be improved.

Particularly, when prediction of the safety of the operation object is performed safely as described in the second embodiment, the possibility that an action range is narrowed becomes high due to existence of the dynamic object in the failure occurrence range. For this reason, by a combination with this embodiment, an action enabled range of a vehicle system can be widened in a state in which safety is secured.

Fourth Embodiment

An action planning system according to a fourth embodiment of the present invention will be described. The fourth embodiment is different from the first embodiment in that a failure occurrence range is recognized in action prediction performed by an integration recognition unit 602 and an outside-world recognition map is updated on the assumption that a dynamic object enters the range.

Figure 16A:
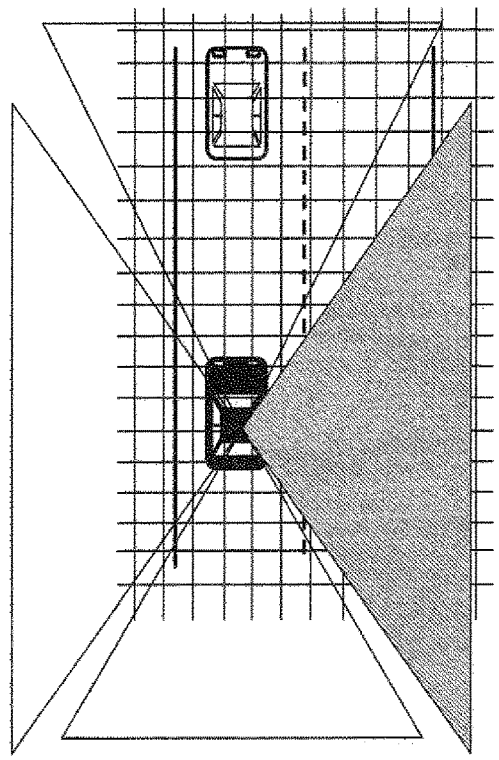
FIGS. 16A to 16D illustrate an example of an outside-world recognition map and trajectory generation at the time of failure occurrence in accordance with a fourth embodiment of the present invention.
Figure 16B:
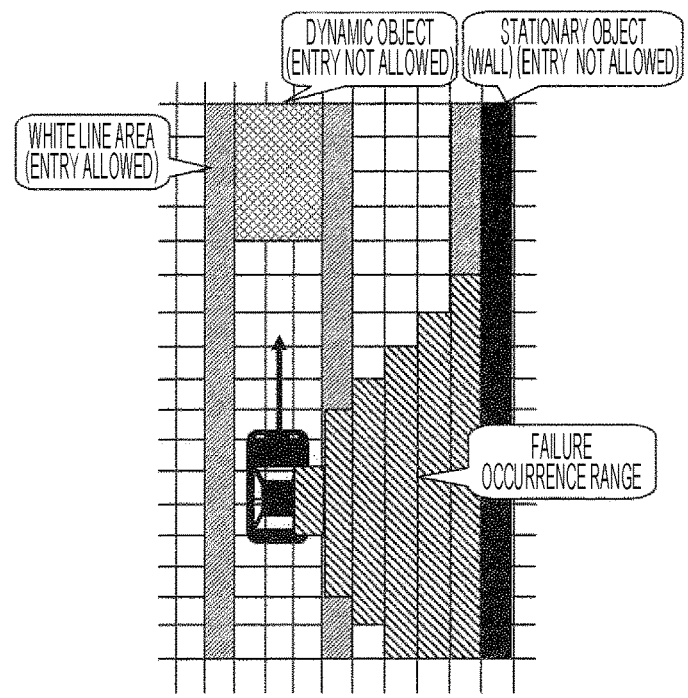
Figure 16C:
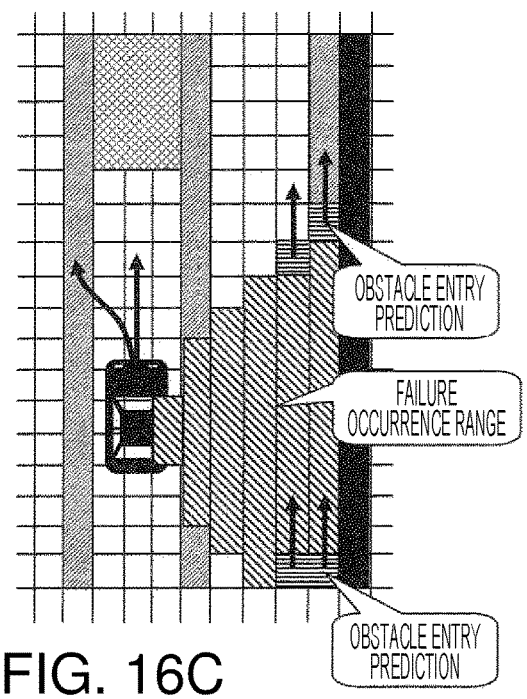
Figure 16D:
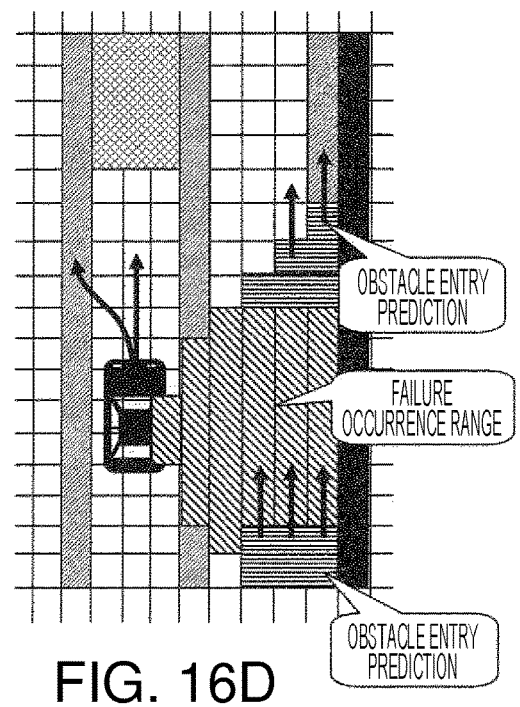

FIGS. 16A to 16D illustrate operation examples when a failure occurs. FIG. 16A illustrates an example of the case where a recognition device of a right side of a vehicle fails. When the dynamic object does not exist in a failure occurrence area until just before the failure occurs, as illustrated in FIG. 16B, it is determined that the dynamic object does not exist in the failure occurrence area in an outside-world recognition map, immediately after the failure occurs. After constant time passes, it is assumed that the object enters from a range in which the dynamic object can enter from an entry allowed range (a range in which it is assumed that there is no stationary object of which an entry is not allowed), in an area where a failure occurs and recognition is disabled, and prediction is performed (FIG. 16C). Then, similar to the embodiments, it is assumed that the dynamic object enters from a direction where recognition is disabled and an entry is allowed and a trajectory is generated.

In this way, when there is a dead angle direction due to the occurrence of the failure, the action prediction is performed on the dynamic object entering from the dead angle direction and collision can be avoided.

Fifth Embodiment

An action planning system according to a fifth embodiment of the present invention will be described. The fifth embodiment is different from the first embodiment in processing in the case where there is a recognition device having a recognition range overlapping a recognition range of a recognition device where a failure has occurred.

An example of the case where one of recognition devices of a right side of a vehicle fails is illustrated. A recognition result of a recognition device in which a failure does not occur in that case is illustrated in FIG. 17A. Here, in the recognition result of FIG. 17A, there is the undecided area (area where recognition by the recognition device is difficult) described above and there is an area where a dynamic object may exist ("undecided detection area" in the drawing). When a failure does not occur, the existence probability of the undecided area is improved by superimposition of the probabilities output from a plurality of recognition devices, as described above.

An example of the case where a failure occurs in a recognition device observing the same area as the recognition area in FIG. 17A is illustrated in FIG. 17B. In this case, an outside-world recognition method when the failure occurs is the same as the method described in the first embodiment. Here, as an example, the existence probability that a dynamic object exists in an area where the dynamic object does not exist until the failure occurs, in a failure occurrence range, is set as 0.3 uniformly and an area where the dynamic object exists until the failure occurs and an action prediction range of the dynamic object thereof are set as the existence probability of 0.8.

A superimposition result of these recognition results is described in FIG. 17C. In an area of A in the drawing, because it is recognized that an object does not exist (the existence probability is 0) in a recognition device (hereinafter, referred to as a normal recognition device) in which a failure does not occur, the existence probability of the dynamic object to be a multiplication result thereof becomes 0.

In an area of B in the drawing, because an output of the normal recognition device is an undecided area, the existence probability calculated by the normal recognition device is 0.3 and if the existence probability is multiplied with the existence probability (0.3) of the failure occurrence area, the existence probability of a result becomes 0.09. In normal superimposition, if an output of a recognition device in which a failure occurs at the present time is normal and the existence probability is clear (1 or 0), the existence probability after the superimposition becomes clear more (0.3 or 0). However, when an obstacle does not exist in the past even in the case where the failure occurs, the existence probability can be decreased.

In an area of (C) in the drawing, recognition can be surely performed from a normal recognition device (existence probability of 1.0). If the existence probability is superimposed on the existence probability (0.8) of the recognition device in which the failure occurs, the existence probability becomes 0.8. Similar to the above, if the recognition device in which the failure occurs is normal, the existence probability becomes clear more. However, the existence probability can be increased for a place where the existence probability is high, on the basis of information in which the dynamic object exists in the past.

As such, for a range in which recognition is performed by superimposition of a plurality of recognition devices, prediction is performed on a failure range when the failure occurs and the existence probabilities are estimated and superimposed. As a result, an action in which safety according to a failure prediction result is secured can be taken as compared with the case where recognition is performed by only the normal recognition device when the failure occurs.

For the action prediction of the failure occurrence range at that time, the prediction is performed safely as described in the second embodiment. As a result, the existence probability of an undecided detection area can be predicted safely as compared with the case where an outside-world recognition map is generated by only the recognition device in which the failure does not occur.

Sixth Embodiment

Figure 18A:
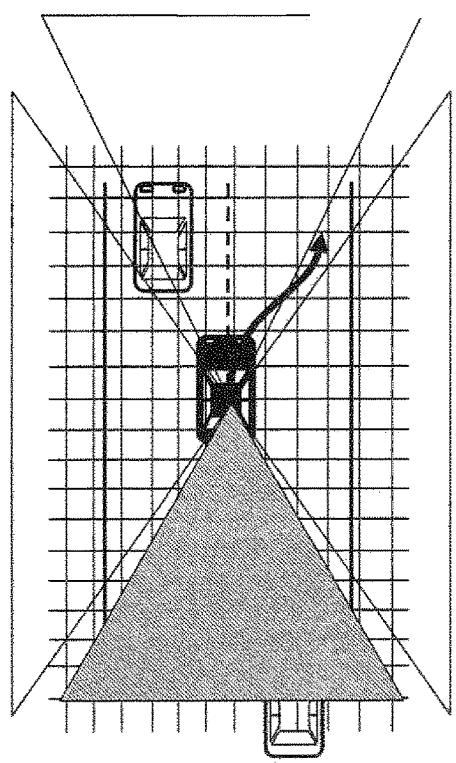
FIGS. 18A to 18D illustrate an example of an outside-world recognition map and trajectory generation at the time of failure occurrence in accordance with a sixth embodiment of the present invention.
Figure 18B:
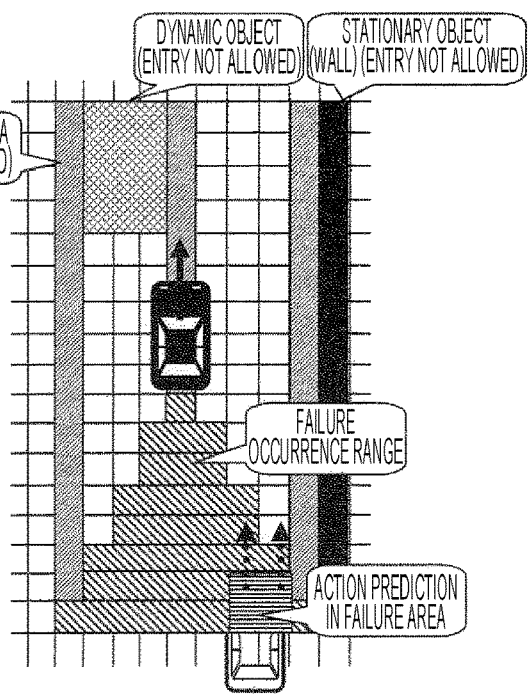

An action planning system according to a sixth embodiment of the present invention will be described. Here, an operation example of the case where a non-assumed situation occurs during a traffic lane change operation will be described. As a specific example of the non-assumed situation, FIG. 18A illustrates an example of the case where a failure occurs in a recognition device monitoring a rear side. An example of an outside-world recognition map in that case and a generation example of a trajectory are illustrated in FIG. 18B. Similar to the first embodiment, in this embodiment, control is executed while a failure range is predicted. However, in this case, a safe state when a failure occurs is to stop a traffic lane change operation (that is, an operation of movement to left and right traffic lanes). As a result, the risk is avoided from occurring due to continuously executing the traffic lane change operation, with respect to vehicles approaching from rear sides of both the left and right traffic lanes.

At this time, a vehicle system provides the vehicle state to a user. As such, occurrence of a failure is provided to the user, so that the user continuously executes control thereafter and can maintain a safe state. In addition, the vehicle system provides the occurrence of the failure to the exterior of a vehicle. As such, the occurrence of the failure is provided to the exterior of the vehicle, so that other vehicle can confirm that a failure occurs in the vehicle executing the control and can take an avoidance action. As an example of a method of providing the occurrence of the failure to the exterior of the vehicle, a hazard lamp is turned on.

As controls when the traffic lane change operation is stopped, various controls are considered. First, one of the controls when the traffic lane change operation is stopped is to continuously execute an operation along the traffic lane, in a state in which a traffic lane width direction position where the traffic lane change operation has stopped is maintained. In this case, a trajectory generation/determination unit 603 newly generates a trajectory along the traffic lane from the position where the traffic lane change operation has stopped and a motion control unit 604 controls the vehicle along the generated trajectory. During this period, the control is delivered to the user to be a driver. For example, in the case where the non-assumed situation occurs when the vehicle is at the traffic lane width direction position over a plurality of traffic lanes, the vehicle runs along the traffic lanes in a state in which the vehicle is over the plurality of traffic lanes. In the case where the non-assumed situation is failures of some recognition devices 6, when an integration recognition unit 602 can detect a course direction (that is, a direction of the traffic lane or a direction of a dividing line such as a white line) of a road by recognition devices 6 in which a failure does not occur, the vehicle is controlled on the basis of the detected course direction.

Another example of the controls when the traffic lane change operation is stopped is as follows. First, the trajectory generation/determination unit 603 divides the traffic lane change operation into a plurality of steps and executes processing according to each step. It is determined which step the vehicle belongs to, on the basis of a trajectory generated when the traffic lane change operation is executed or a relative position of the vehicle to the traffic lane. Because the traffic lane change operation is an operation associated with an original traffic lane and a different traffic lane such as a neighboring traffic lane, operations considered as safe operations are different according to the individual steps. Therefore, if different control can be executed according to each step of the traffic lane change operation when the non-assumed situation occurs, the possibility of securing safety can be increased for other vehicle as well as an own vehicle.

When the step which the vehicle belongs to is determined by the relative position of the vehicle to the trajectory, a progress degree or a progress rate of the own vehicle to an entire route from a starting point to an ending point of the trajectory is used. In addition, when the step which the vehicle belongs to is determined by the relative position of the vehicle to the traffic lane, the step is determined on the basis of the relative position of the vehicle to a direction coupling a traffic lane of a change origin and a traffic lane of a change destination (that is, a direction crossing a course direction of a road or a traffic lane width direction). In addition, it is simplest and easiest to set a position of the vehicle to a center position of a longitudinal direction and a width direction of the vehicle. However, any position such as a position of a camera, a position of a driver seat, a corner of the vehicle, and a front portion can be used.

Specifically, the traffic lane change operation is divided into three steps of an initial step, a middle step, and a late step. The individual steps may be obtained by dividing the traffic lane change operation into the three steps simply. However, the initial step may be set as the case where the vehicle is included in only a traffic lane of a movement origin, the middle step may be set as the case where the vehicle is over both traffic lanes, and the late step may be set as the case where the vehicle is included in only a traffic lane of a movement destination.

Next, control in each step when the traffic lane change operation is divided into the three steps will be described. First, a state (hereinafter, referred to the middle step) other than the initial step (for example, ⅔ of the vehicle width exists on a traffic lane before the movement) and the late step (for example, ⅔ of the vehicle width exists on a traffic lane after the movement) will be described. In the initial step, the vehicle moves to return to the traffic lane of the movement origin and in the late step, the vehicle moves to the traffic lane of the movement destination. In this way, because a movement amount after the traffic lane change operation is stopped can be reduced, safety can be increased. More specifically, in the initial step, the vehicle returns to an original traffic lane width direction position (a starting point of the trajectory of the original traffic lane change operation) on the traffic lane of the movement origin. In addition, in the late step, the vehicle moves to an ending point of the trajectory of the original traffic lane change operation. Control of the late step corresponds to that the traffic lane change operation stopped once is resumed and completed as a result.

In the initial step or the late step, various other controls are considered. For example, a method of moving the own vehicle to a position where a passage width of other vehicle is secured in a lane in which an inclusion ratio of the own vehicle is small in the two traffic lanes which the own vehicle is over, is also considered. That is, in the case of the initial step, the own vehicle moves to a position where a passage width of other vehicle is secured in the traffic lane of the movement origin and in the case of the late step, the own vehicle moves to a position where a passage width of other vehicle is secured in the traffic lane of the movement destination. According to this control, because it is possible to secure a space where other vehicle passes through the side of the own vehicle, other vehicle can avoid the risk easily.

In the middle step, various controls are considered. Similar to one of the controls when the traffic lane change operation is stopped, which is described above, one of the controls in the middle step is to execute an operation along the traffic lane, in a state in which a traffic lane width direction position where the traffic lane change operation has stopped is maintained.

As another example of the control in the middle step, it is considered that the own vehicle is moved in a lane in which an inclusion ratio of the own vehicle is large in the two traffic lanes which the own vehicle is over. In this way, because a movement amount after the traffic lane change operation is stopped can be reduced, safety can be increased. More preferably, the own vehicle is moved such that a side portion of the own vehicle comes to a position corresponding to a boundary line (generally, a dividing line) of the two traffic lanes. In this way, the own vehicle evacuates from the other traffic lane different from the traffic lane of the own vehicle. Meanwhile, because the own vehicle is at a position close to an edge in the traffic lane of the own vehicle, the risk avoidance can be easily performed for other vehicle running on the same traffic lane as the own vehicle.

As another control example of the middle step, a method of measuring a distance of each following vehicle and the own vehicle when there are following vehicles in both left and right neighboring traffic lanes and moving the own vehicle to a position close to the traffic lane at a large distance is also considered. As a different control example, a method of moving the own vehicle to the preceding traffic lane or the traffic lane having a running space such as a road shoulder in both the traffic lanes is also considered. In this way, even when the following vehicle approaches rapidly, an avoidance route of the following vehicle can be secured.

Figure 18C:
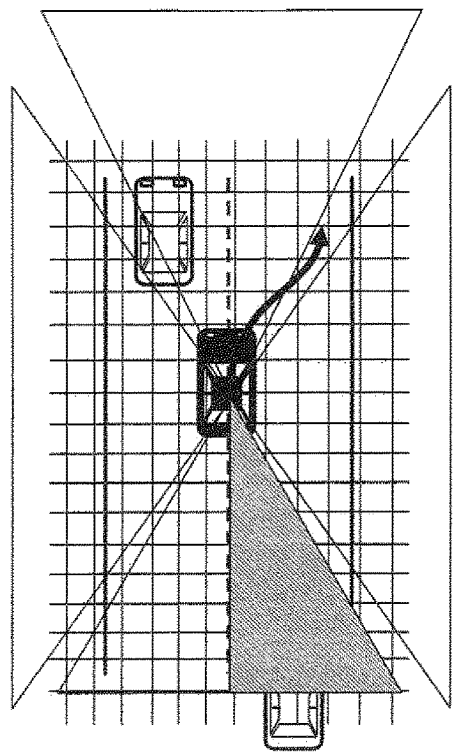
Figure 18D:
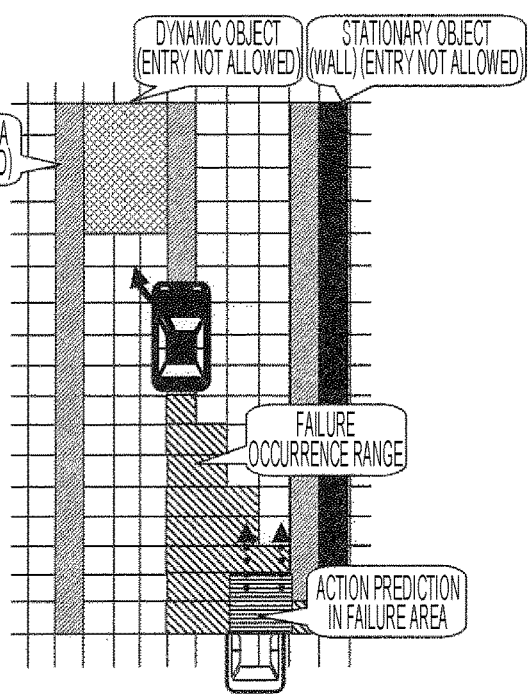

In addition, an example of the case where a failure occurs in functions of a part (for example, right-half recognition devices of a rear side) of recognition devices of the rear side of the vehicle is illustrated in FIG. 18(c). As such, when the safety of any traffic lane is secured, the own vehicle moves to the side of the traffic lane (in this example, the left side) in which the safety is confirmed (FIG. 18(d)), so that a safe action can be taken.

For the action of the middle step, the priority is changed by the course of the vehicle and the action thereafter and the action can be taken. For example, when a fork/route change is performed by the traffic lane change, it is considered that a threshold to continue a movement is increased. For example, in the above, as a threshold for being divided into the late step, the ratio where the own vehicle exists on the traffic lane after the movement is set as "⅔ of the vehicle width". However, the threshold may be set as a value smaller than ⅔. In addition, in the middle step, it is considered that, even when the traffic lane width direction position is maintained and the own vehicle runs, the own vehicle is maintained to be close to the movement destination traffic lane and the traffic lane change is easily performed thereafter. In the case of a front vehicle passing operation, it is considered that a threshold of the original traffic lane return is increased. For example, in the above, as a threshold for being divided into the initial step, the ratio where the own vehicle exists on the traffic lane after the movement is set as "⅔ of the vehicle width". However, the threshold may be set as a value smaller than ⅔.

The sixth embodiment is an embodiment of the case where the recognition device 6 fails as the non-assumed situation. However, the control in the case where the traffic lane change operation is stopped in the sixth embodiment is effective to not only the case where the failure occurs in the recognition device 6 but also other case. For example, other case is the case where other vehicle (particularly, a following vehicle) not assumed when a trajectory is generated during the traffic lane change operation is recognized. Even in other case, the traffic lane change operation is stopped, so that occurrence of the risk can be avoided. Among the configurations and the effects described above, the configuration and the effect not limited to the case of the occurrence of the failure are commonly applicable to other case.

According to the embodiments described above, when a failure occurs in a recognition device of a vehicle system, a failure occurrence range is recognized and an action according to the failure occurrence range is taken, so that safety of the vehicle system can be secured. Particularly, a highly safe trajectory in which a safe state is maintained can be generated using past outside-world recognition information of the failure occurrence range.

In addition, according to a different embodiment, trajectory generation is performed after safely performing prediction of a dynamic object existing before occurrence of the failure in the failure occurrence range. As a result, safe action planning can be made and a safe state can be maintained.

In addition, according to a different embodiment, a trajectory to prevent the dynamic object from entering the failure occurrence range is generated and an action is taken, so that the risk of the dynamic object entering the failure occurrence range can be avoided.

In addition, according to a different embodiment, action prediction is performed on the assumption that the dynamic object enters from a dead angle direction of the failure occurrence range, so that a safe trajectory can be generated with respect to the dynamic object entering from the dead angle direction of the failure occurrence range.

In addition, according to a different embodiment, when a failure occurs in any recognition device in an area where a plurality of recognition devices perform recognition by a superimposition method, the dynamic object is recognized with high precision in accordance with an action prediction result and action planning when the failure occurs can be made.

In addition, according to a different embodiment, even in the case where the failure occurs in a recognition device when a traffic lane changes, maintenance of a safe state according to a current control state and notification to a user and the exterior of a vehicle are performed and the safe state can be maintained.

REFERENCE SIGNS LIST 1 vehicle system
2 vehicle control system
3 communication device
4 vehicle control system
5 drive device
6 recognition device
7 output device
8 input device
9 notification device 301 network link
302 ECU
303 GW
401 processor
402 I/O
403 timer
404 ROM
405 RAM
406 internal bus
501 control unit
502 communication management unit
503 time management unit
504 data table
505 buffer
601 action planning system
602 integration recognition unit
603 trajectory generation/determination unit
604 motion control unit
605 user input unit
606 output management unit
607 notification management unit
608 failure detection unit
1001 outside-world recognition map
1300 display device
1301 situation display
1302 course display
1303 failure place display

The invention claimed is:

1. An action planning device, comprising:
a failure detection unit that is configured to detect an occurrence of a failure in outside-world recognition units, and issue a notification;
an integration recognition unit that is configured to integrate outside-world recognition information output from the outside-world recognition units, and output integration recognition information; and
a trajectory generation/determination unit that is configured to send, to a drive unit, a control instruction to execute an action on the occurrence of the failure, on the basis of the integration recognition information output by the integration recognition unit, wherein
the trajectory generation/determination unit is configured to send, to the drive unit, the control instruction to take an action that addresses the failure, on the basis of the notification of the failure detection unit,
the trajectory generation/determination unit is configured to generate a vehicular trajectory to avoid a dynamic object from entering a failure occurrence range, in which recognition of one of the outside-world recognition units is disabled.

2. The action planning device according to claim 1, wherein the trajectory generation/determination unit is configured to generate the vehicular trajectory that addresses the failure in outside-world recognition units so as to enter a safe state based on past outside-world recognition information in the failure occurrence range which the failure detection unit issued the notification.

3. The action planning device according to claim 1, wherein the trajectory generation/determination unit is configured to determine a failure occurrence time, and is configured to discard outside-world recognition information in the failure occurrence range which the failure detection unit recognized after the failure occurrence time.

4. The action planning device according to claim 1, further comprising:
a notification unit that is configured to output information regarding the failure to the exterior of a vehicle.

5. The action planning device according to claim 1, wherein the integration recognition unit is configured to predict that the dynamic object existing in a recognition range of the outside-world recognition units in which the failure has occurred will perform an action at a higher risk than the case where the outside-world recognition units are not in failure.

6. The action planning device according to claim 1, wherein the integration recognition unit in which a failure does not occur outputs an existence probability of the outside-world recognition information in the same area as the failure occurrence range.

7. The action planning device according to claim 1, wherein the trajectory generation/determination unit is configured to perform, for maintaining a safe state in a middle step of a traffic lane change, at least one action of
executing an operation to maintain the width direction position in a traffic lane at which a traffic lane change operation has stopped, (ii) when an own vehicle is over two traffic lanes, moving the vehicle into the lane having the larger inclusion ration of the vehicle, (iii) measuring a distance from the own vehicle to each following vehicle when there are following vehicles in both the left and right neighboring traffic lanes, and moving the own vehicle to a position closer to the traffic lane having the greater of the two distances.

8. The action planning device according to claim 1, further comprising:
an output unit that is configured to notify a user of a failure occurrence state.

9. An action planning device, comprising:
a failure detection unit that is configured to detect an occurrence of a failure in outside-world recognition units, and issue a notification;
an integration recognition unit that is configured to integrate outside-world recognition information output from the outside-world recognition units, and output integration recognition information; and
a trajectory generation/determination unit that is configured to send, to a drive unit, a control instruction to execute an action on the occurrence of the failure, on the basis of the integration recognition information output by the integration recognition unit, wherein
the trajectory generation/determination unit is configured to send, to the drive unit, the control instruction to take an action that addresses the failure, on the basis of the notification of the failure detection unit,
the trajectory generation/determination unit is configured to perform, for maintaining a safe state in a middle step of a traffic lane change, at least one action of
(i) executing an operation to maintain the width direction position in a traffic lane at which a traffic lane change operation has stopped, (ii) when an own vehicle is over two traffic lanes, moving the vehicle into the lane having the larger inclusion ration of the vehicle, (iii) measuring a distance from the own vehicle to each following vehicle when there are following vehicles in both the left and right neighboring traffic lanes, and moving the own vehicle to a position closer to the traffic lane having the greater of the two distances.

10. The action planning device according to claim 9, wherein the trajectory generation/determination unit is configured to generate a vehicular trajectory that addresses the failure in outside-world recognition units so as to enter a safe state based on past outside-world recognition information in the failure occurrence range which the failure detection unit issued the notification.

11. The action planning device according to claim 9, wherein the trajectory generation/determination unit is configured to determine a failure occurrence time, and is configured to discard outside-world recognition information in the failure occurrence range which the failure detection unit recognized after the failure occurrence time.

12. The action planning device according to claim 9, further comprising:
   a notification unit that is configured to output information regarding the failure to the exterior of a vehicle.

13. The action planning device according to claim 9, wherein the integration recognition unit is configured to predict that a dynamic object existing in a recognition range of the outside-world recognition units in which the failure has occurred will perform an action at a higher risk than the case where the outside-world recognition units are not in failure.

14. The action planning device according to claim 9, wherein the integration recognition unit is configured to superimpose an action prediction result in the failure occurrence range and an existence probability of the outside-world recognition information in the same area as the failure occurrence range output from a recognition device in which a failure does not occur.

15. The action planning device according to claim 9, wherein the trajectory generation/determination unit is configured to generate a vehicular trajectory to avoid a dynamic object from entering a failure occurrence range.

16. The action planning device according to claim 9, further comprising:
   an output unit that is configured to notify a user of a failure occurrence state.

* * * * *